(12) United States Patent
Phan et al.

(10) Patent No.: US 10,308,358 B2
(45) Date of Patent: Jun. 4, 2019

(54) PASSENGER CARRYING UNMANNED AERIAL VEHICLE POWERED BY A HYBRID GENERATOR SYSTEM

(71) Applicant: Top Flight Technologies, Inc., Malden, MA (US)

(72) Inventors: Long N. Phan, Somerville, MA (US); Samir Nayfeh, Shrewsbury, MA (US); Eli M. Davis, Cambridge, MA (US)

(73) Assignee: Top Flight Technologies, Inc., Malden, MA (US)

( * ) Notice: Subject to any disclaimer, the term of this patent is extended or adjusted under 35 U.S.C. 154(b) by 0 days.

(21) Appl. No.: 15/593,535

(22) Filed: May 12, 2017

(65) Prior Publication Data

US 2018/0244384 A1 Aug. 30, 2018

Related U.S. Application Data

(60) Provisional application No. 62/339,284, filed on May 20, 2016, provisional application No. 62/335,938, filed on May 13, 2016.

(51) Int. Cl.
*B64C 39/02* (2006.01)
*B64D 27/24* (2006.01)
*B64D 27/02* (2006.01)

(52) U.S. Cl.
CPC .......... *B64C 39/024* (2013.01); *B64C 39/022* (2013.01); *B64C 39/026* (2013.01); *B64D 27/24* (2013.01); *B64C 2201/027* (2013.01); *B64C 2201/042* (2013.01); *B64C 2201/066* (2013.01); *B64C 2201/141* (2013.01); *B64C 2201/146* (2013.01); *B64C 2201/18* (2013.01); *B64D 2027/026* (2013.01); *Y10T 464/10* (2015.01)

(58) Field of Classification Search
CPC ...... B64C 39/026; H02K 7/003; Y10T 464/10
See application file for complete search history.

(56) References Cited

U.S. PATENT DOCUMENTS 2,936,973 A * 5/1960 Kappus ............... B64C 29/0091
244/23 R
3,135,481 A * 6/1964 Lyle ........................ B64C 27/02
244/23 C
4,546,939 A 10/1985 Cronin
(Continued)

OTHER PUBLICATIONS

International Search Report and Written Opinion for App. Serial No. PCT/US2017/032493, dated Sep. 18, 2017, 11 pages.
(Continued)

*Primary Examiner* — Brian M O'Hara
*Assistant Examiner* — Michael B. Kreiner
(74) *Attorney, Agent, or Firm* — Fish & Richardson P.C.

(57) ABSTRACT

An unmanned aerial vehicle includes at least one rotor motor configured to drive at least one propeller to rotate; a passenger compartment sized to contain a human or animal passenger; and a hybrid generator system configured to provide power to the at least one rotor motor and to generate lift sufficient to carry the human or animal passenger. The hybrid generator system includes a rechargeable battery configured to provide power to the at least one rotor motor; an engine configured to generate mechanical power; and a generator motor coupled to the engine and configured to generate electrical power from the mechanical power generated by the engine.

29 Claims, 22 Drawing Sheets

(56) References Cited

U.S. PATENT DOCUMENTS

| | | | |
|---|---|---|---|
| 4,814,579 A | | 3/1989 | Mathis et al. |
| 5,653,404 A | * | 8/1997 | Ploshkin .................. B63G 8/00 |
| | | | 244/12.2 |
| 6,282,897 B1 | * | 9/2001 | Paul ........................ B60K 6/24 |
| | | | 123/565 |
| 6,845,942 B2 | * | 1/2005 | Paul ..................... B64C 39/026 |
| | | | 244/12.2 |
| 6,854,686 B2 | * | 2/2005 | Perlo .................... B64C 39/026 |
| | | | 244/23 R |
| 6,886,776 B2 | * | 5/2005 | Wagner .................... B64C 3/56 |
| | | | 244/12.4 |
| 7,802,755 B2 | * | 9/2010 | Poltorak ................. B64C 27/10 |
| | | | 244/12.2 |
| 8,333,574 B2 | * | 12/2012 | Rowe, Jr. ............... F04D 29/582 |
| | | | 417/319 |
| 8,353,199 B1 | | 1/2013 | Ma et al. |
| 9,477,226 B2 | | 10/2016 | Olson et al. |
| 9,488,231 B2 | * | 11/2016 | Nicholas ................... F16D 3/02 |
| 2006/0049304 A1 | | 3/2006 | Sanders, Jr. et al. |
| 2016/0023527 A1 | * | 1/2016 | Dietrich ................... B60F 5/02 |
| | | | 244/2 |
| 2016/0052626 A1 | | 2/2016 | Vander Mey |
| 2016/0137304 A1 | | 5/2016 | Phan et al. |

OTHER PUBLICATIONS

International Preliminary Report on Patentability for App. Serial No. PCT/US2017/032493, dated Nov. 13, 2018, 8 pages.

* cited by examiner

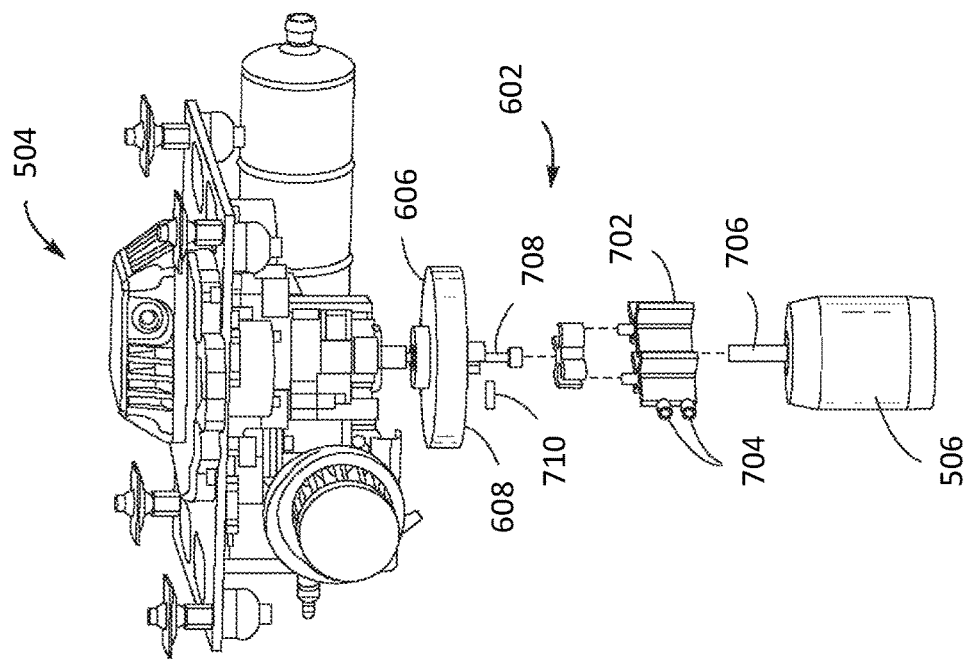
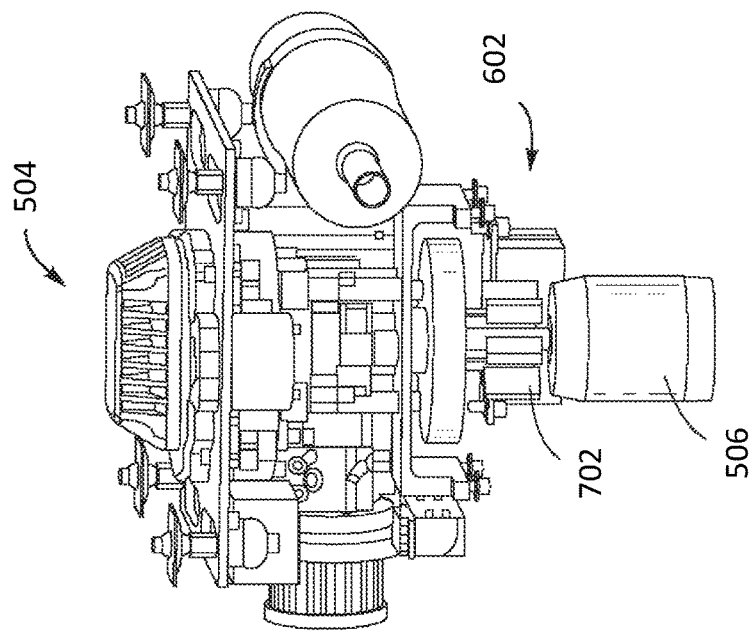

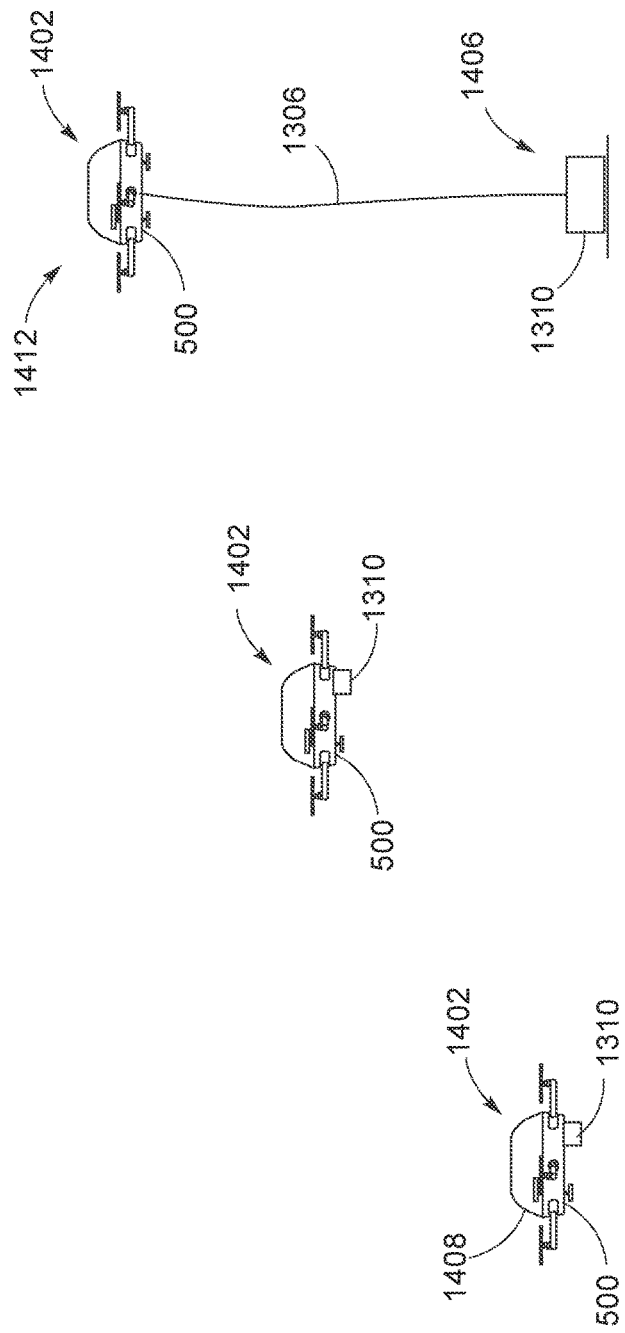
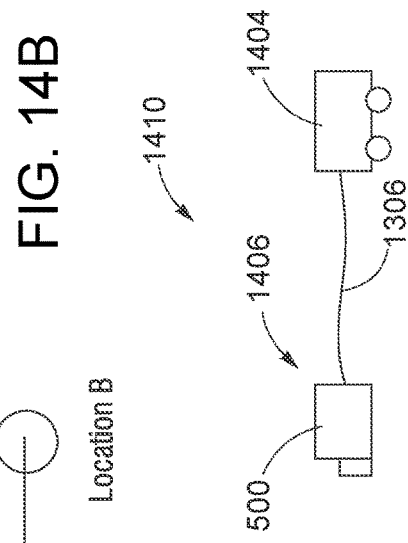
FIG. 14B
FIG. 14A

PASSENGER CARRYING UNMANNED AERIAL VEHICLE POWERED BY A HYBRID GENERATOR SYSTEM

CLAIM OF PRIORITY

This application claims priority to U.S. Patent Application Ser. No. 62/339,284, filed on May 20, 2016, and to U.S. Patent Application Ser. No. 62/335,938, filed on May 13, 2016, the contents of both of which are incorporated here by reference in their entirety.

BACKGROUND

A multi-rotor unmanned aerial vehicle (UAV) may include rotor motors, one or more propellers coupled to each rotor motor, electronic speed controllers, a flight control system (auto pilot), a remote control (RC) radio control, a frame, and a rechargeable battery, such as a lithium polymer (LiPo) or similar type rechargeable battery. Multi-rotor UAVs can perform vertical take-off and landing (VTOL) and are capable of aerial controls with similar maneuverability to single rotor aerial vehicles.

SUMMARY

In an aspect, an unmanned aerial vehicle includes at least one rotor motor configured to drive at least one propeller to rotate; a passenger compartment sized to contain a human or animal passenger; and a hybrid generator system configured to provide electrical energy to the at least one rotor motor and to generate lift sufficient to carry the human or animal passenger. The hybrid generator system includes a rechargeable battery configured to provide electrical energy to the at least one rotor motor; an engine configured to generate mechanical energy; and a generator motor coupled to the engine and configured to generate electrical energy from the mechanical power generated by the engine.

Embodiments can include one or more of the following features.

The electrical energy generated by the generator motor is provided to at least one of the rotor motor and the rechargeable battery.

The unmanned aerial vehicle includes a climate control system configured to control one or more of a temperature, a humidity, and an oxygen content within the passenger compartment. The climate control system receives electrical energy from one or more of the generator motor and the rechargeable battery.

The unmanned aerial vehicle includes a control system configured to enable the passenger to cause the unmanned aerial vehicle to land. The control system is configured to receive information indicative of a destination from the passenger. The control system is configured to receive operating instructions from a remote control center.

The passenger sized compartment is positioned on a top side of a frame of the unmanned aerial vehicle.

The passenger sized compartment is positioned on a bottom side of a frame of the unmanned aerial vehicle.

The passenger sized compartment is sized to contain a single human passenger.

The rechargeable battery is sized to provide at least a minimum amount of electrical energy.

The unmanned aerial vehicle includes a weather sensor configured to detect weather conditions.

The unmanned aerial vehicle includes a control system configured to automatically modify a flight plan based on data detected by the weather sensor.

The unmanned aerial vehicle includes a sensor configured to detect a condition of one or more components of the unmanned aerial vehicle. The unmanned aerial vehicle includes a control system configured to automatically modify a flight plan based on data detected by the sensor.

The unmanned aerial vehicle includes an energy absorbing connector, in which the hybrid power generation system is coupled to a frame of the unmanned aerial vehicle through the energy absorbing connector.

The hybrid energy generation system is configured to generate at least 150 kW of electrical power.

The hybrid energy generation system is configured to generate up to 1 MW of electrical power.

The generator motor is rigidly coupled to the engine.

The generator motor is coupled to the engine by a metal plate.

The engine includes one or more of a two-stroke reciprocating piston engine, a four-stroke reciprocating piston engine, a gas turbine, and a rotary engine.

The unmanned aerial vehicle includes a cooling system configured to cool the hybrid energy generation system.

The generator motor comprises one or more of a permanent magnet synchronous generator, an induction generator, and a switched reluctance generator.

BRIEF DESCRIPTION OF THE DRAWINGS

FIG. 7A depicts a side view of a hybrid generator.

FIG. 7B depicts an exploded side view of a hybrid generator.

FIG. 14A depicts a diagram of a hybrid generator system with detachable subsystems integrated as part of a UAV.

FIG. 14B depicts a diagram of a hybrid generator system with detachable subsystems integrated as part of a ground robot.

DETAILED DESCRIPTION

We describe here an unmanned aerial vehicle (UAV) powered by a hybrid generator and that can be used, e.g., for short distance point-to-point passenger transportation. These passenger-carrying UAVs include a passenger compartment to contain one or more passengers during transit. The hybrid generator of these passenger-carrying UAVs is scaled (e.g., for output power, load performance, etc.) to generate sufficient lift to carry the passenger and his personal items, and can be designed with sufficient redundancy to ensure the safety of the passenger.

Figure 1:
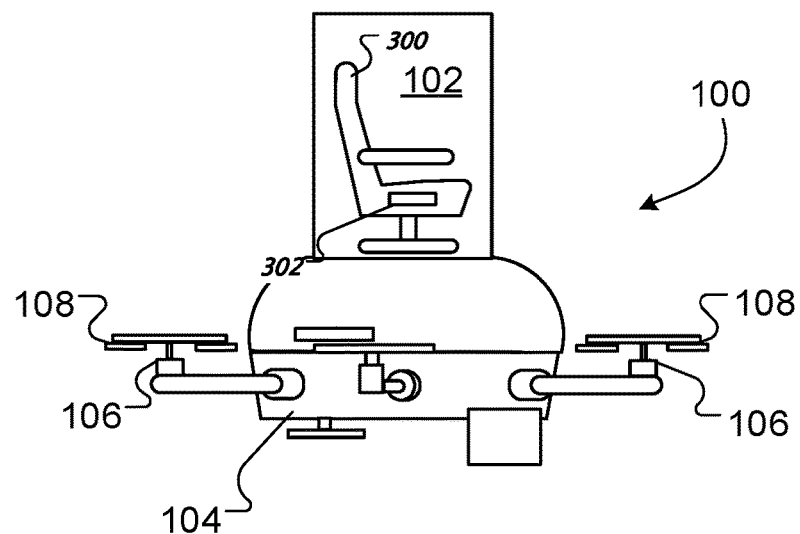
FIGS. 1 and 2 are diagrams of passenger-carrying UAVs.
Figure 2:
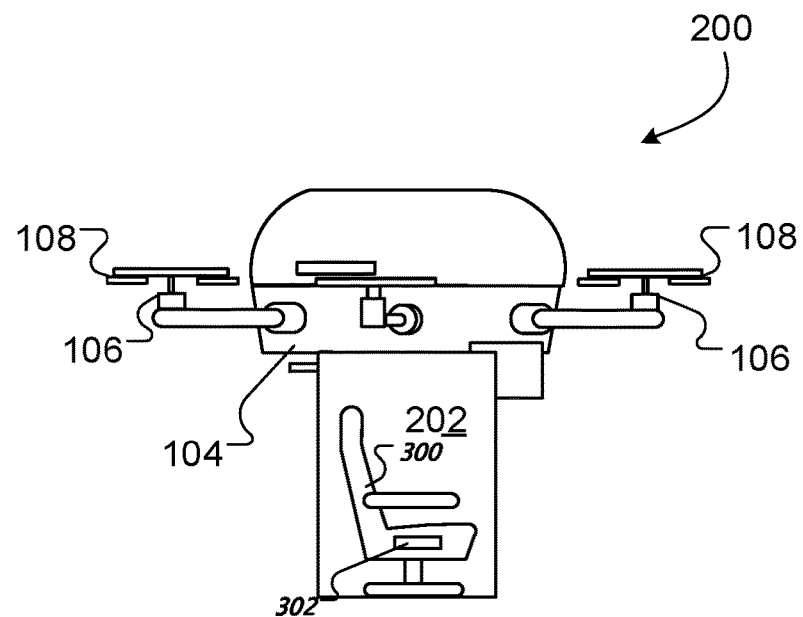

Referring to FIG. 1, in some examples, a passenger-carrying UAV 100 includes a passenger compartment 102 sized to carry a single passenger. The passenger compartment 102 is positioned above a frame 104 of the UAV. The passenger-carrying UAV 100 includes a hybrid generator system that includes multiple rotors 106 each coupled to a propeller 108, as described in greater detail below. The propellers 108 generate sufficient lift to carry the passenger-carrying UAV 100 and the contents of the passenger compartment 102 (e.g., a person and the person's personal items, such as a suitcase). Referring to FIG. 2, in some examples, a passenger compartment 202 can be positioned below a frame 204 of a passenger-carrying UAV 200.

In the examples of FIGS. 1 and 2, the UAVs 100, 200 include passenger compartments 102, 202 that are sized to carry a single passenger. In some examples, the passenger compartments 102, 202 can be sized to carry multiple passengers, such as two, three, four, five, or another number of passengers. When the passenger compartment 102, 202 is sized to carry multiple passengers, the hybrid generator can be configured to generate a greater amount of lift in order to carry the greater weight of multiple passengers. For instance, the hybrid generator can include larger motors and propellers, a larger number of rotors and propellers, can include an engine configured to generate a larger amount of power, etc.

Figure 3:
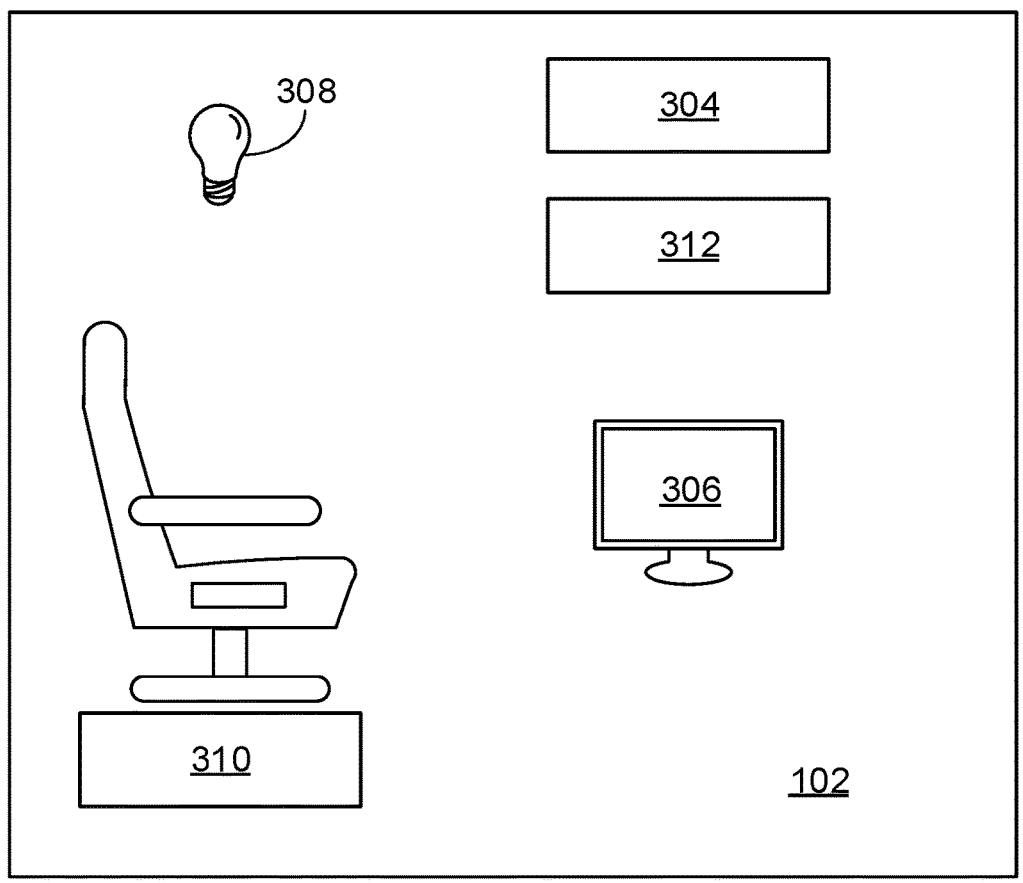
FIG. 3 is a diagram of a passenger compartment.

Referring to FIG. 3, the interior of the passenger compartment 102 can include amenities for the comfort and/or safety of a passenger. For instance, the passenger compartment 102 can include a seat 300 with a seatbelt 302, a climate control system 304 to maintain the interior of the passenger compartment 102 at a comfortable temperature, humidity, and/or oxygen content; an entertainment system 306, such as an audio or video system; a computing device, etc.; one or more lights 308; storage space 310 for the passenger's personal belongings; or other amenities. The passenger compartment 102 can be equipped with a communications system 312, such as a wireless Internet system, a radio system through which the passenger can communicate with a remote control center, or other types of communications capability.

Figure 4A:
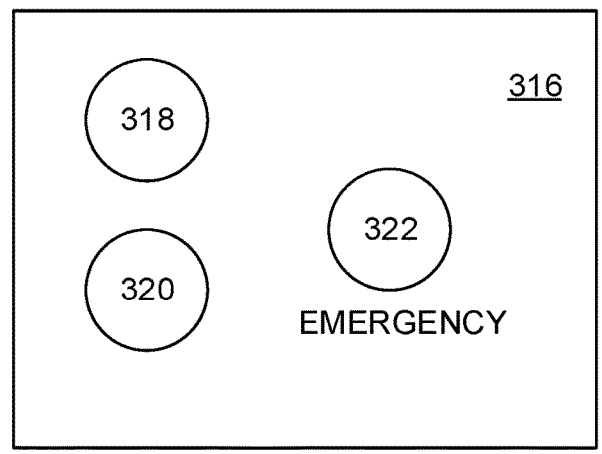
FIGS. 4A and 4B are diagrams of control interfaces.
Figure 4B:
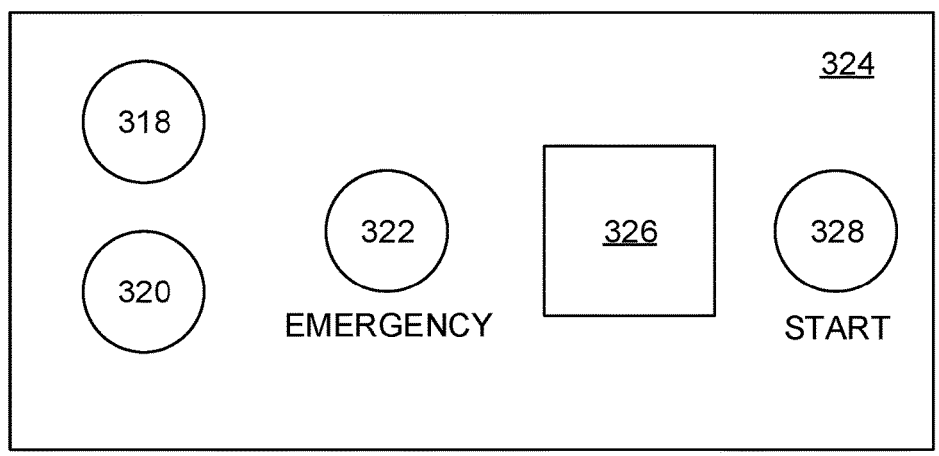

In some examples, a control interface is housed in the interior of the passenger compartment. The control interface can enable the passenger to have varying degrees of control over the operation of the UAV 100. Referring to FIG. 4A, in some examples, a limited control interface 316 provides the passenger with only limited ability to control the operation of the UAV. For instance, the limited control interface 316 includes portions of the communications system 312 (e.g., a speaker 318 and a microphone 320) and an emergency button 322, which the passenger can press in the event of an emergency (e.g., a medical emergency, an equipment failure, or another reason) to cause the UAV to land quickly. The operation of a UAV equipped with a limited control interface 316 can be primarily controlled by a remote control center, which can transmit coordinates or an address of a destination to the UAV, initiate a flight, or perform other control tasks. Referring to FIG. 4B, in some examples, a control interface 324 can provide the passenger with additional control capabilities. For instance, the control interface 324 includes the additional features of a screen 326 (e.g., a touch sensitive screen) into which the passenger can enter coordinates or an address of a destination and a start button 328, which the passenger can press to initiate the flight.

The passenger carrying UAVs described here are powered by a hybrid generator system that is sized to generate sufficient lift to carry the passenger and his personal items. For instance, the hybrid generator system can be sized to carry up to about 200 pounds, up to about 250 pounds, up to about 300 pounds, or another weight. In some examples, a large safety tolerance can be designed into the hybrid generator system. For instance, the hybrid generator system can be sized to carry more weight than the amount of weight permitted in the passenger compartment during operation of the UAV.

The hybrid generator system powering the passenger carrying UAVs described here can be designed with redundancy in order to ensure the safety of the passengers. For instance, a multi-rotor UAV can be designed to fly safely even when one or more of the rotors or propellers are disabled. The UAV can be equipped with large batteries in order to provide enough power to allow the UAV to land safely in the event of an engine failure. The UAV can utilizes sensors, such navigational sensors, atmospheric or weather sensors, or other types of sensors, to detect wind conditions, to monitor its own health, or to perform other monitoring, e.g., in order to anticipate and/or avoid hazardous flying conditions. The battery system and electrical controls can be designed to automatically and seamlessly provide system power in case of loss of primary engine power. When this happens, the passenger carrying UAV can be diverted for a safe landing at the closest emergency landing point. Within an area of operation, emergency landing points can be defined and the battery pack sized such that in all cases of operation there will always be sufficient energy for the passenger carrying UAV to reach an emergency landing point under battery power.

The sensor array can be used to monitor local weather conditions and prohibit flight in the case of unsafe conditions (high winds, excessive ambient temperatures, high rain or low visibility), or to terminate an existing flight plan or modify a flight plan in the case of changing weather conditions. The sensor array can also be used to monitor the performance of the critical flight components to ensure safe operation and monitor for required maintenance. For example, temperature sensors on the propeller motors can be used to monitor operating temperature versus load. If the motor operating temperature falls outside a predefined range, the motor will be flagged for inspection prior to the next flight. In some examples, an existing flight plan can be modified or terminated based on results of monitoring performance of the flight components.

In a specific example, a UAV sized to carry a single passenger and personal items weighing up to 100 kg weighs between about 250 kg and about 350 kg and carries between about 50 kg and about 150 kg of fuel. Such a UAV utilizes approximately 125 kW of electric power to fly, and therefore utilizes an engine capable of producing approximately 150 kW or mechanical power.

The engine can be a two-stroke reciprocating piston engine, a four-stroke reciprocating piston engine, a gas turbine, a rotary engine, or another type of engine.

Passenger carrying UAVs can be used to transport people for short distance point-to-point transportation to or from areas of low population or areas that are hard to access using conventional transportation infrastructure. In an example, passenger carrying UAVs can be used for inter-island transportation in island archipelagos, e.g., between islands of Japan, Hawaii, the Philippines, or other regions having closely spaced islands. Passenger carrying UAVs can be used to provide air transportation services to islands, towns, or regions that do not have enough population to justify regular commercial air service or whose geography makes a standard airport impractical. Passenger carrying UAVs can be used for short distance urban travel, e.g., acting as a taxi that is not subject to traffic patterns or delays. In some instances, the UAVs can assist with personnel movements within a particular facility or venue; for example, to efficiently move individuals to various locations within an airport, a sporting venue, an industrial or military complex, etc.

In some examples, the passenger compartment of a passenger carrying UAV can be modified to be suited for animal transportation, such as for transportation of livestock or wild animals. For instance, if a cow falls ill while grazing far from its ranch, the cow can be loaded onto a passenger carrying UAV equipped for livestock transportation and returned to its ranch or to a veterinary facility for treatment. Similarly, an injured endangered animal encountered in the wild can be loaded onto a passenger carrying UAV and transported to a zoo or veterinary facility for treatment, and subsequently returned to its wild environment.

The UAV 100 can be powered by a hybrid generator system that provides an portable hybrid generator power source with energy conversion efficiency. In UAV applications, the hybrid generator system can be used to overcome the weight of the vehicle, the hybrid generator drive, and fuel used to provide extended endurance and payload capabilities in UAV applications.

The hybrid generator system can include two separate power systems. A first power system included as part of the hybrid generator system can be a small and efficient gasoline powered engine coupled to a generator motor. The first power system can serve as a primary source of power of the hybrid generator system. A second power system, included as part of the hybrid generator system, can be a high energy density rechargeable battery. Together, the first power system and the second power system combine to form a high energy continuous power source and with high peak power availability for a UAV and for other components housed on the UAV, such as components for navigation, data processing, data storage, communications, or other capabilities. In some examples, one of the first power system and the second power system can serve as a back-up power source of the hybrid generator system if the other power system experiences a failure.

Figure 5:
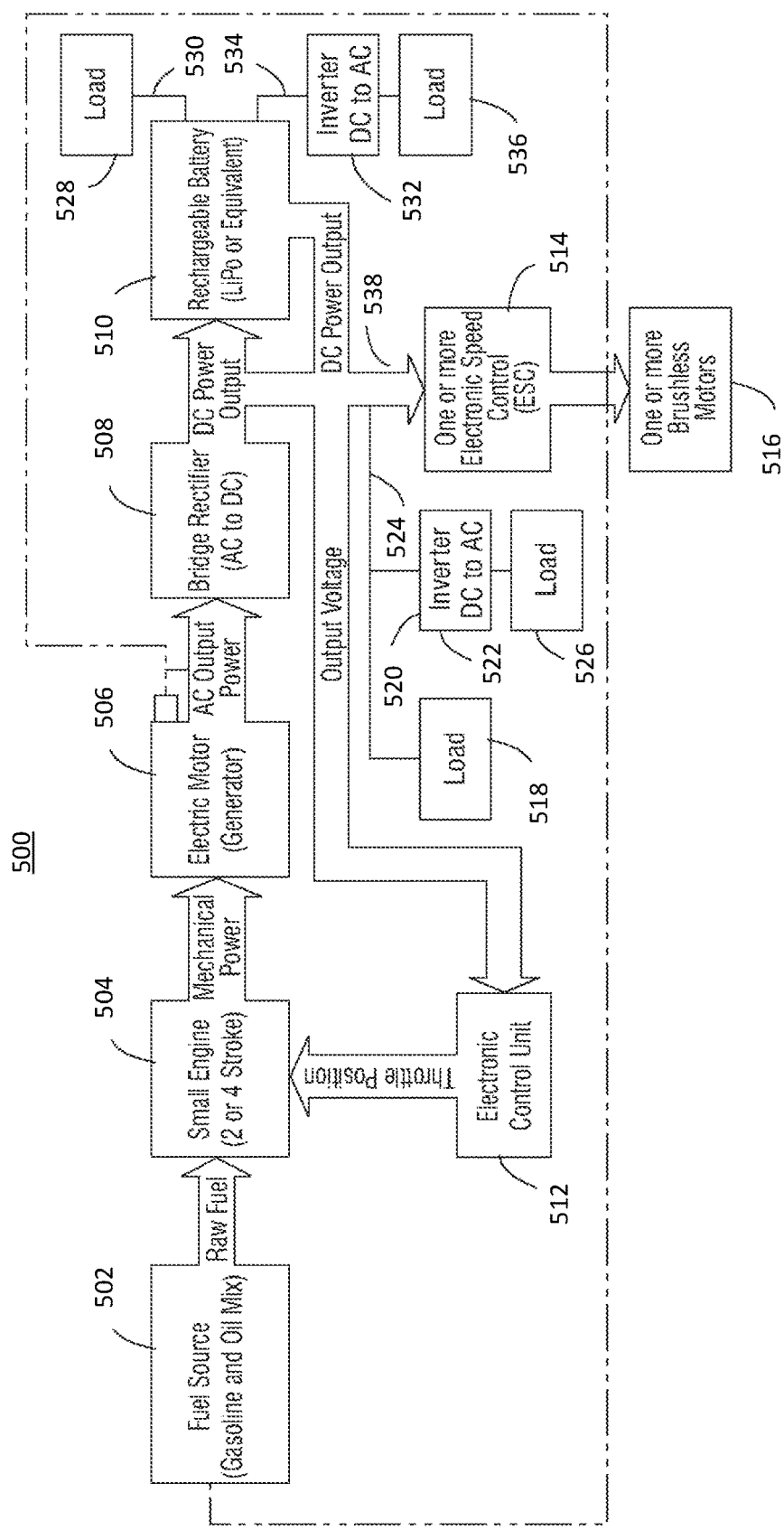
FIG. 5 depicts a diagram of an example hybrid generator system.

FIG. 5 depicts a diagram of an example hybrid generator system 500. The hybrid generator system 500 includes a fuel source 502, e.g., a vessel for storing gasoline, a mixture of gasoline and oil mixture, or similar type fuel or mixture. The fuel source 502 provides fuel to an engine 504, of a first power system. The engine 504 can use the fuel provided by the fuel source 502 to generate mechanical energy. In one example, the engine 504 can have dimensions of about 12" by 11" by 6" and a weight of about 3.5 lbs to allow for integration in a UAV. In one example, the engine 504 may be an HWC/Zenoah G29 RCE 3D Extreme available from Zenoah, 1-9 Minamidai Kawagoe, Saitama 350-2025, Japan. The hybrid generator system 500 also includes a generator motor 506 coupled to the engine 504. The generator motor 506 functions to generate AC output power using mechanical power generated by the engine 504. In some examples, a shaft of the engine 504 includes a fan that dissipates heat away from the engine 504. In some examples, the generator motor 506 is coupled to the engine 504 through a polyurethane coupling.

In some examples, the hybrid generator system 500 can provide 1.8 kW of power. The hybrid generator system 500 can include an engine 504 that provides approximately 3 horsepower and weighs approximately 1.5 kg, e.g., a Zenoah® G29RC Extreme engine. The hybrid generator system 500 can include a generator motor 506 that is a brushless motor, 380 Kv, 8 mm shaft, part number 5035-380, available from Scorpion Precision Industry®. A hybrid generator system 500 that provides 1.8 kW of power can operate with an RPM output of about 6000 rpm.

In some examples, the hybrid generator system 500 can provide 10 kW of power. The hybrid generator system 500 can include an engine 504 that provides approximately between 15-16.5 horsepower and weighs approximately 7 pounds, e.g. a Desert Aircraft® D-150. The hybrid generator system 500 can include a generator motor 506 that is a Joby Motors® JM1 motor. A hybrid generator system 500 that provides 10 kW of power can operate with a high RPM output, such as about 6000 rpm, and can exhibit good reliability and a long life span. A hybrid generator system 500 providing 10 kW of power can be suitable for unmanned UAVs, such as UAVs for freight transport, surveillance, or data collection and/or processing.

In some examples, the hybrid generator system 500 can provide 100 kW of power. In some examples, the hybrid generator system 500 can provide up to 1 MW of power, such as about 120 kW, 150 kW, 200 kW, 300 kW, 400 kW, 500 kW, 600 kW, 700 kW, 800 kW, 900 kW, or 1 MW of power. For instance, a hybrid generator system 500 can include a Continental Diesel CD-155 piston engine or a Lycoming iE2 piston engine coupled to a 120 kW generator. The generator can be one or more of a permanent magnet synchronous generator, an induction generator, a switched reluctance generator, or other types of rotary generators. A hybrid generator system 500 that provides 120 kW of power can be suitable for a manned or passenger carrying UAV.

The hybrid generator system 500 includes a bridge rectifier 508 and a rechargeable battery 510. The bridge rectifier 508 is coupled between the generator motor 506 and the rechargeable battery 510 and converts the AC output of the generator motor 506 to DC power to charge the rechargeable battery 510 or provide DC power to load 518 by line 520 or power to DC-to-AC inverter 522 by line 524 to provide AC power to load 526. The rechargeable battery 510 may provide DC power to load 528 by line 530 or to DC-to-AC inverter 532 by line 534 to provide AC power to load 536.

In one example, an output of the bridge rectifier 508 and/or the rechargeable battery 510 of hybrid generator system 500 is provided by line 538 to one or more electronic speed control devices (ESC) 514 integrated in one or more rotor motors 516 as part of an UAV. The ESC 514 can control the DC power provided by bridge rectifier 508 and/or rechargeable battery 510 to one or more rotor motors provided by generator motor 506. In one example, the ESC 514 can be a T-Motor® ESC 45A (2-6S) with SimonK. In one example, the bridge rectifier 508 can be a model #MSD100-08, diode bridge 800V 100A SM3, available from Microsemi Power Products Group®. In some examples, active rectification can be applied to improve efficiency of the hybrid generator system.

In some examples, the ESC 514 can control an amount of power provided to one or more rotor motors 516 in response to input received from an operator. For example, if an operator provides input to move a UAV to the right, then the ESC 514 can provide less power to rotor motors 516 on the right of the UAV to cause the rotor motors to spin propellers on the right side of the UAV slower than propellers on the left side of the UAV. As power is provided at varying levels to one or more rotor motors 516, a load, e.g. an amount of power provided to the one or more rotor motors 516, can change in response to input received from an operator.

In some examples, the rechargeable battery 510 may be a LiPo battery, providing 3000 mAh, 22.2V 65C, Model PLU65-30006, available from Pulse Ultra Lipo®, China. In other designs, the rechargeable battery 510 may be a lithium sulfur (LiSu) rechargeable battery or similar type of rechargeable battery.

The hybrid generator system 500 includes an electronic control unit (ECU) 512. The ECU 512, and other applicable systems described in this paper, can be implemented as a computer system, a plurality of computer systems, or parts of a computer system or a plurality of computer systems. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, isdn modem, cable modem, token ring interface, Ethernet interface, satellite transmission interface (e.g. "direct PC"), or other interfaces for coupling a computer system to other computer systems. Interfaces enable computer systems and other devices to be coupled together in a network.

A computer system can be implemented as a module, as part of a module, or through multiple modules. As used in this paper, a module includes one or more processors or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the module's functionality, or the like. As such, a first module and a second module can have one or more dedicated processors, or a first module and a second module can share one or more processors with one another or other module s. Depending upon implementation-specific or other considerations, a module can be centralized or its functionality distributed. A module can include hardware, firmware, or software embodied in a computer-readable medium for execution by the processor. The processor transforms data into new data using implemented data structures and methods, such as is described with reference to the FIGS. in this paper.

The ECU 512 is coupled to the bridge rectifier 508 and the rechargeable battery 510. The ECU 512 can be configured to measure the AC voltage of the output of the generator motor 506, which is directly proportional to the revolutions per minute (RPM) of the engine 504, and compares it to the DC power output of the bridge rectifier 508. The ECU 512 can control the throttle of the engine 504 to cause the DC power output of the bridge rectifier 508 to increase or decrease as the load changes, e.g., a load of one or more electric motors 516 or one or more of loads 518, 526, 528, and 536. In one example, the ECU 512 can be an Arduino® MEGA 2560 Board R3, available from China. In various embodiments, a load of one or more electric motors 516 can change as the ESC 514 changes an amount of power provided to the electric motors 516. For example, if a user inputs to increase the power provided to the electric motors 516 subsequently causing the ESC 514 to provide more power to the electric motors 516, then the ECU 512 can increase the throttle of the engine 504 to cause the production of more power to provide to the electronic motors 516.

The ECU 512 can function to maintain voltage output of loads by reading the sensed analog voltage, converting these to ADC counts, comparing the count to that corresponding to a desired voltage, and increasing or decreasing the throttle of the engine 504 according to the programmed gain if the result is outside of the dead band.

In one example, the hybrid generator system 500 can provide about 1,800 watts of continuous power, 10,000 watts of instantaneous power (e.g., 6S with 16,000 mAh pulse battery) and has a 1,500 Wh/kg gasoline conversion rate. In one example, the hybrid generator system 500 has dimensions of about 12" by 12" by 12" and a weight of about 8 lbs.

Figure 6:
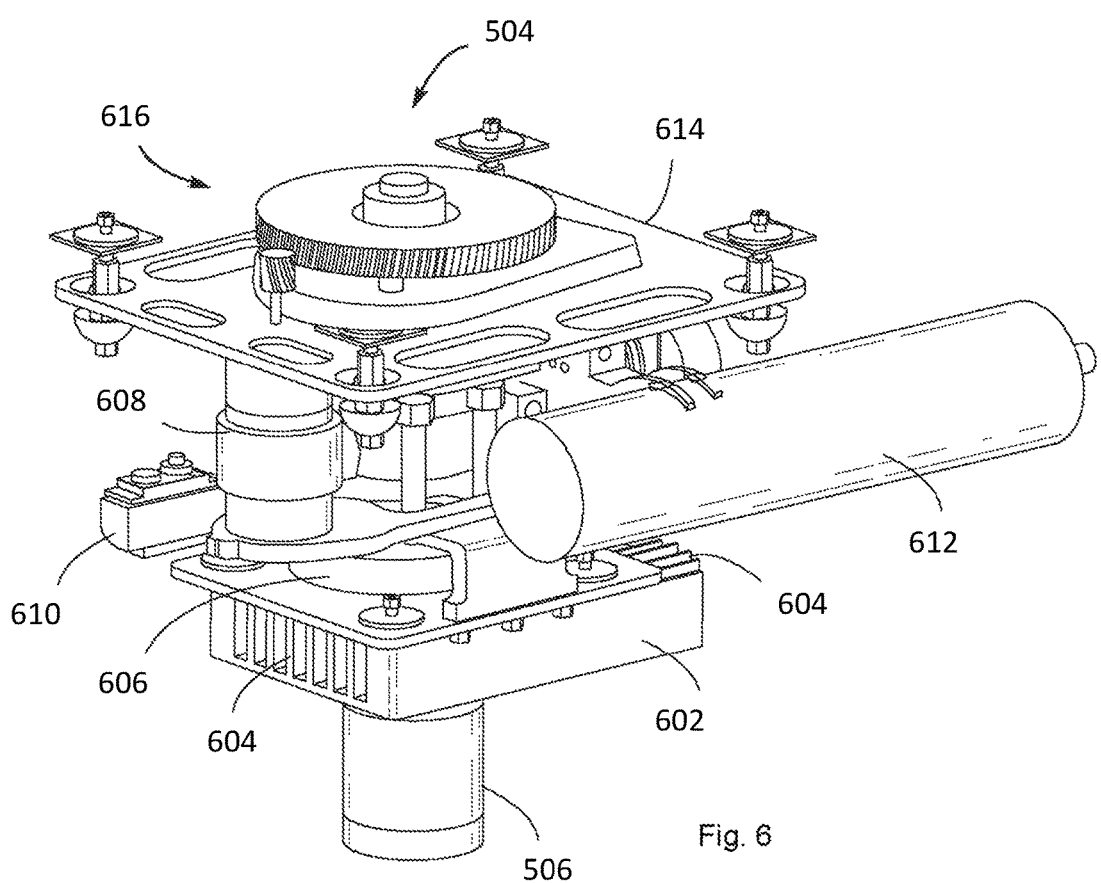
FIG. 6 depicts a side perspective view of a hybrid generator system.
Figure 22A:
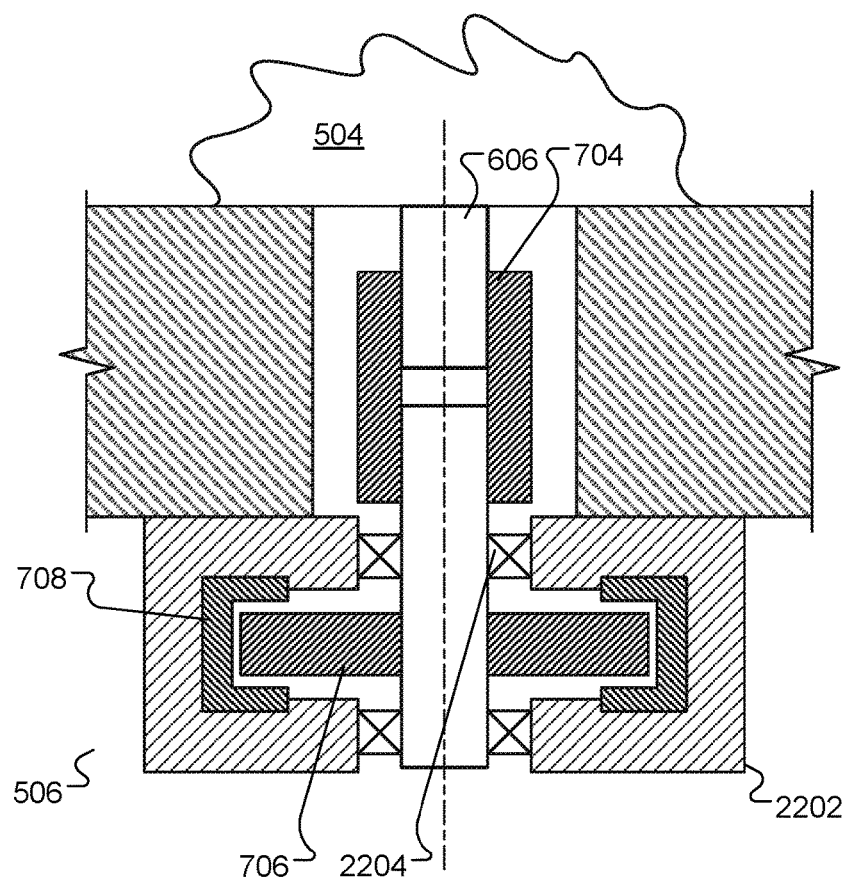
FIGS. 22A and 22B are diagrams of portions of a hybrid generator system.

FIG. 6 depicts a side perspective view of a hybrid generator system 500. FIG. 7A depicts a side view of a hybrid generator 500. FIG. 7B depicts an exploded side view of a hybrid generator 500. The hybrid generator system 500 includes an engine 504 coupled to generator motor 506. In one embodiment, the engine 504 includes a coupling/cooling device 602 which provides coupling of the shaft of the generator motor 506 to the shaft of engine 504 and also provides cooling with sink fins 604. For example, FIGS. 7A and 7B, show in further detail one embodiment of coupling/cooling device 602, which includes coupling/fan 702 with set screws 704 that couple shaft 706 of generator motor 506 and shaft 708 of engine 504. Coupling/cooling device 602 may also include rubber coupling ring 2202 (FIG. 22A).

In various embodiments, the hybrid generator system 500 includes components to facilitate transfer of heat away from the hybrid generator system 500 and/or is integrated within a UAV to increase airflow over components that produce heat. For example, the hybrid generator system 500 can include cooling fins on specific components, e.g. the rectifier, to transfer heat away from the hybrid generator system. In various implementations, the hybrid generator system 500 includes components and is integrated within a UAV to cause heat to be transferred towards the exterior of the UAV.

In various embodiments, the hybrid generator system 500 and/or a UAV integrating the hybrid generator system 500 is configured to allow 406 cubic feet per minute of airflow across at least one component of the hybrid generator system 500. An engine 504 of the hybrid generator system 500 can be run at an operating temperature 150° C. and if an ambient temperature in which the hybrid generator system 10, in order to remove heat generated by the engine 506, an airflow of 406 cubic feet per minute is achieved across at least the engine 506. Further in various embodiments, the engine 506 is operated at 16.5 Horsepower and generates 49.2 kW of waste heat, e.g. each head of the engine produces 24.6 kW of waste heat. In various embodiments, engine heads of the engine 506 of the hybrid generator system 500 are coupled to electric ducted fans to concentrate airflow over the engine heads. For example, 406 cubic feet per minute airflow can be achieved over engine heads of the engine 506 using electric ducted fans.

In various embodiments, the hybrid generator system 500 is integrated as part of a UAV using a dual vibration damping system. An engine 506 of the hybrid generator system can utilize couplings to serve as dual vibration damping systems. In one example, the engine 506 produces a mean torque of 1.68 Nm at 10,000 RPM. In the various embodiments, a urethane coupling is used to couple, at least part of, the hybrid generator system 500 to a UAV. Further in the one example, the urethane coupling can have a durometer value of between 90A to 75D. Example urethane couplings used to secure, at least part of, the hybrid generator system 500 to a UAV include L42 Urethane, L100 Urethane, L167 Urethane, and L315 Urethane. Urethane couplings used to secure, at least part of, the hybrid generator system 500 to a UAV can have a tensile strength between 20 MPa and 62.0 MPa, between 270 to 800% elongation at breaking, a modulus between 2.8 MPa and 32 MPa, an abrasion index between 110% and 435%, and a tear strength split between 12.2 kN/m and 192.2 kN/m.

In some examples, the engine 504, FIGS. 6 and 7, can also include a fly wheel 606 which reduces mechanical noise and/or engine vibration. In some examples, the engine 504 can include a Hall Effect sensor 710, FIG. 7A, and Hall Effect magnet coupled to fly wheel 606 as shown. In one example, Hall-effect sensor 710 may be available from RCexl Min Tachometer®, Zhejiang Province, China.

When engine 504 is operational, fly wheel 606 spins and generates a voltage which is directly proportional to the revolutions per minute of fly wheel 606. This voltage is measured by Hall-effect sensor 710 and is input into an ECU 512. The ECU 512 compares the measured voltage to the voltage output by generator motor 506. ECU 512 will then control the throttle of either or both the generator motor 506 and the engine 504 to increase or decrease the voltage as needed to supply power to one or more of loads 518, 526, 528, and/or 536 or one or more rotor motors 516.

The engine 504 may also include a starter motor 608, servo 610, muffler 612, and vibrational mount 614.

Figure 8:
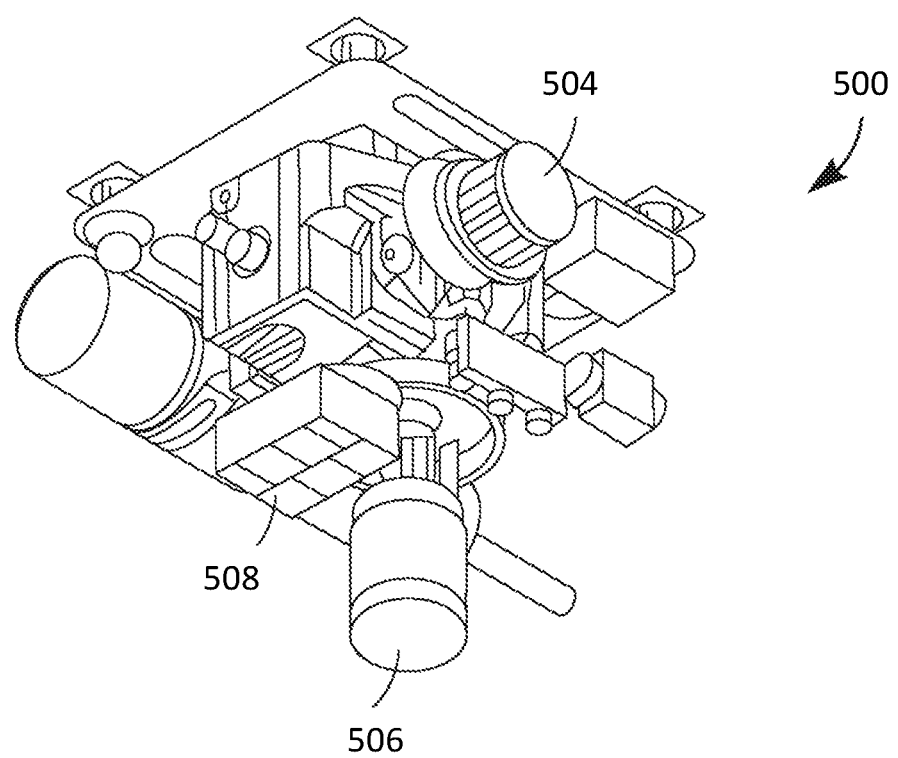
FIG. 8 is a perspective view of a hybrid generator system.

FIG. 8 is a perspective view of a hybrid generator system 500. The hybrid generator system 500 includes a motor 504 and generator motor 506 coupled to a bridge rectifier 508.

Figure 9:
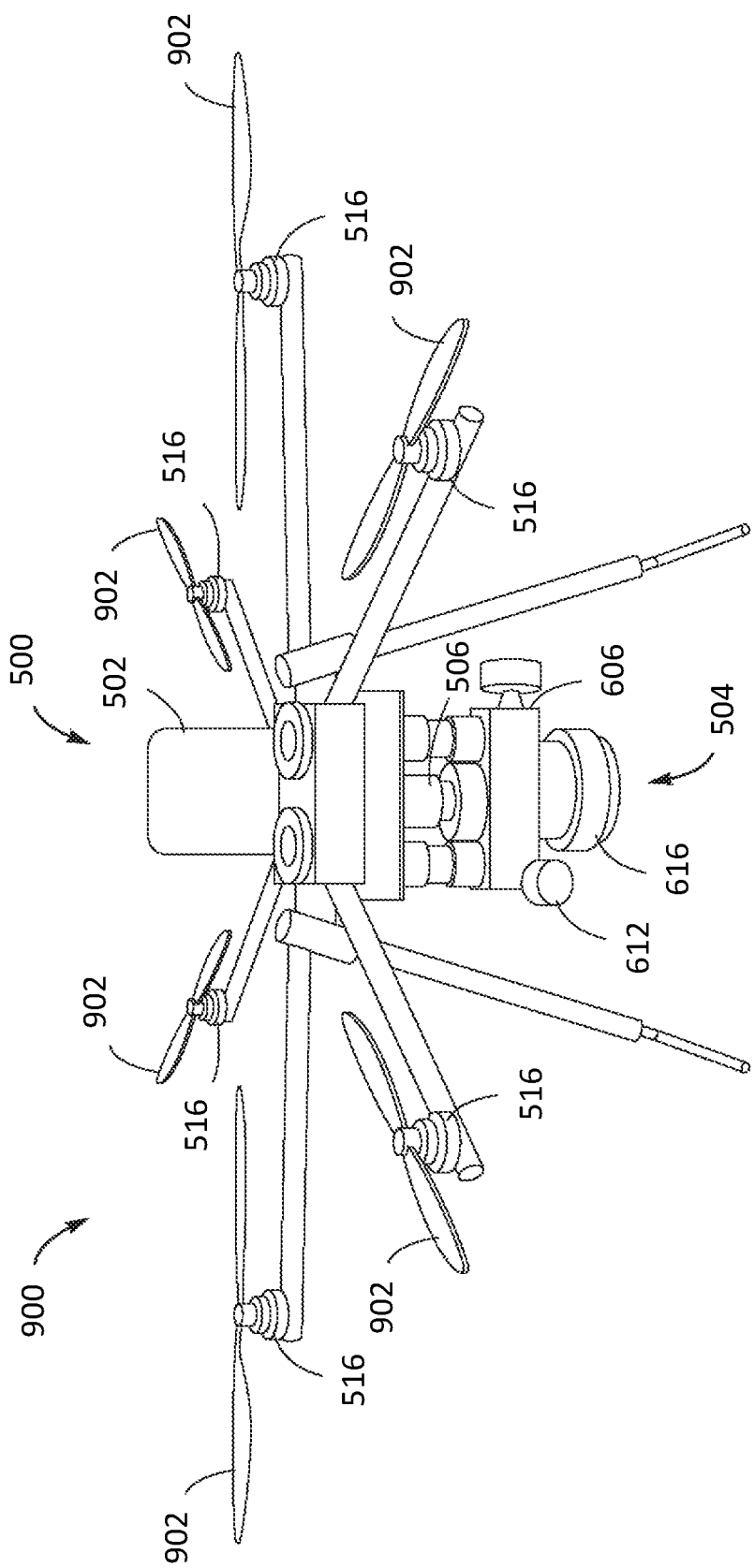
FIG. 9 is a perspective view of a UAV integrated with a hybrid generator system.

FIG. 9 is a perspective view of a UAV 900 integrated with a hybrid generator system 500. The UAV 900 includes six rotor motors 516 each coupled to propellers 902, however it is appreciated that a UAV integrated with a hybrid generator system 500 can include more or less rotor motors and propeller. The UAV 900 can include a Px4 flight controller manufactured by Pixhawk®.

In one embodiment, engine 504, as shown in FIGS. 4-9 may be started using an electric starter 616. Fuel source 502, as shown in FIG. 5 (also shown in FIG. 9) delivers fuel to engine 504 to spin its rotor shaft directly coupled to generator motor 506 as shown in FIG. 7 and applies a force to generator motor 506. The spinning of generator motor 506 generates electricity and the power generated by motor generator 506 is proportional to the power applied by shaft of engine 504. Preferably, a target rotational speed of generator motor 506 is determined based on the KV (rpm/V) of generator motor 506. For example, if a target voltage of 25 Volt DC is desired, the rating of generator motor 506 would be about 400 KV. The rotational speed of the engine 504 may be determined by the following equations:

$$\text{RPM} = \text{KV (RPM/Volt)} \times \text{Target Voltage (VDC)} \qquad (1)$$

$$\text{RPM} = 400 \text{ KV} \times 25 \text{ VDC} \qquad (2)$$

$$\text{RPM} = 10,000 \qquad (3)$$

In this example, for generator motor 506 to generate 25 VDC output, the shaft of generator motor 506 coupled to the shaft of engine 504 needs to spin at about 10,000 RPM.

As the load, e.g., one or more motors 516 or one or more of loads 518, 526, 528, and/or 536, is applied to the output of generator motor 506, the voltage output of the hybrid generator system 500 will drop which will cause the speed of engine 504 and generator motor 506 to be reduced. In this case, ECU 512 can be used to help regulate the throttle of engine 504 to maintain a consistent output voltage that varies with loads. ECU 512 can act like a standard governor for gasoline engines but instead of regulating an RPM, it can regulate a target voltage output of either or both a bridge rectifier and a generator motor 506 based on a closed loop feedback controller.

Power output from generator motor 506 can be in the form of alternating current (AC) which needs to be rectified by bridge rectifier 508. Bridge rectifier 508 can convert the AC power into direct current (DC) power, as discussed above. In various embodiments, the output power of the hybrid generator system 500 can be placed in a "serial hybrid" configuration, where the generator power output by generator motor 506 may be available to charge the rechargeable battery 510 or provide power to another external load.

In operation, there can be at least two available power sources when the hybrid generator system 500 is functioning. A primary source can be from the generator motor 506 through directly from the bridge rectifier and a secondary power source can be from the rechargeable battery 510. Therefore, a combination of continuous power availability and high peak power availability is provided, which may be especially well-suited for UAV applications or a portable generator applications. In cases where either primary (generator motor 506) power source is not available, system 500 can still continue to operate for a short period of time using power from rechargeable battery 510 allowing a UAV to sustain safety strategy, such as an emergency landing.

When hybrid generator system 500 is used for UAVs, the following conditions can be met to operate the UAV effectively and efficiently: 1) the total continuous power (watts) can be greater than power required to sustain UAV flight, 2) the power required to sustain a UAV flight is a function of the total weight of the vehicle, the total weight of the hybrid engine, the total weight of fuel, and the total weight of the payload), where:

$$\text{Total Weight (gram)}=\text{vehicle dry weight}+\text{engine 504 weight}+\text{fuel weight}+\text{payload} \quad (4)$$

and, 3) based on the vehicle configuration and aerodynamics, a particular vehicle will have an efficiency rating (grams/watt) of η, where:

$$\text{Total Power Required to Fly}=\eta\times\text{Weight (gram)} \quad (5)$$

In cases where the power required to sustain flight is greater than the available continuous power, the available power or total energy is preferably based on the size and configuration of the rechargeable battery 510. A configuration of the rechargeable battery 510 can be based on a cell configuration of the rechargeable battery 510, a cell rating of the rechargeable battery 510, and/or total mAh of the rechargeable battery 510. In one example, for a 6S, 16000 mAh, 25C battery pack, the total energy is determined by the following equations:

$$\text{Total Energy}=\text{Voltage}\times\text{mAh}=25\text{ VDC (6S)}\times16000\text{ mAh}=400\text{ Watt*Hours} \quad (6)$$

$$\text{Peak Power Availability}=\text{Voltage}\times\text{mAh}\times\text{C Rating}=25\text{ VDC}\times16000\text{ mAh}\times25\text{ C}=10,400\text{ Watts} \quad (7)$$

$$\text{Total Peak Time}=400\text{ Watt*Hours}/10,400\text{ Watts}=138.4\text{ secs} \quad (8)$$

Further in the one example, the rechargeable battery 510 will be able to provide 10,400 Watts of power for 138.4 seconds in the event of primary power failure from engine 504. Additionally, the rechargeable battery 510 may be able to provide up to 10,400 Watts of available power for flight or payload needs instantaneous peak power for short periods of time needed for aggressive maneuvers.

The result is hybrid generator system 500 when coupled to a UAV efficiently and effectively provides power to fly and maneuver the UAV for extended periods of time with higher payloads than conventional multi-rotor UAVs. In one example, the hybrid generator system 500 can provide a loaded (3 lb. load) flight time of up to about 2 hours 5 mins, and an unloaded flight time of about 2 hours and 35 mins Moreover, in the event that the fuel source runs out or the engine 504 and/or the generator motor 506 malfunctions, the hybrid generator system 500 can use the rechargeable battery 510 to provide enough power to allow the UAV to perform a safe landing. In various embodiments, the rechargeable battery 510 can provide instantaneous peak power to a UAV for aggressive maneuvers, for avoiding objects, or threats, and the like.

In various embodiments, the hybrid generator system 500 can provide a reliable, efficient, lightweight, portable generator system which can be used in both commercial and residential applications to provide power at remote locations away from a power grid and for a micro-grid generator, or an ultra-micro-grid generator.

In various embodiments, the hybrid generator system 500 can be used for an applicable application, e.g. robotics, portable generators, micro-grids and ultra-micro-grids, and the like, where an efficient high energy density power source is required and where a fuel source is readily available to convert hydrocarbon fuels into useable electric power. The hybrid generator system 500 has been shown to be significantly more energy efficient than various forms of rechargeable batteries (Lithium Ion, Lithium Polymer, Lithium Sulfur) and even Fuel Cell technologies typically used in conventional UAVs.

Figure 10:
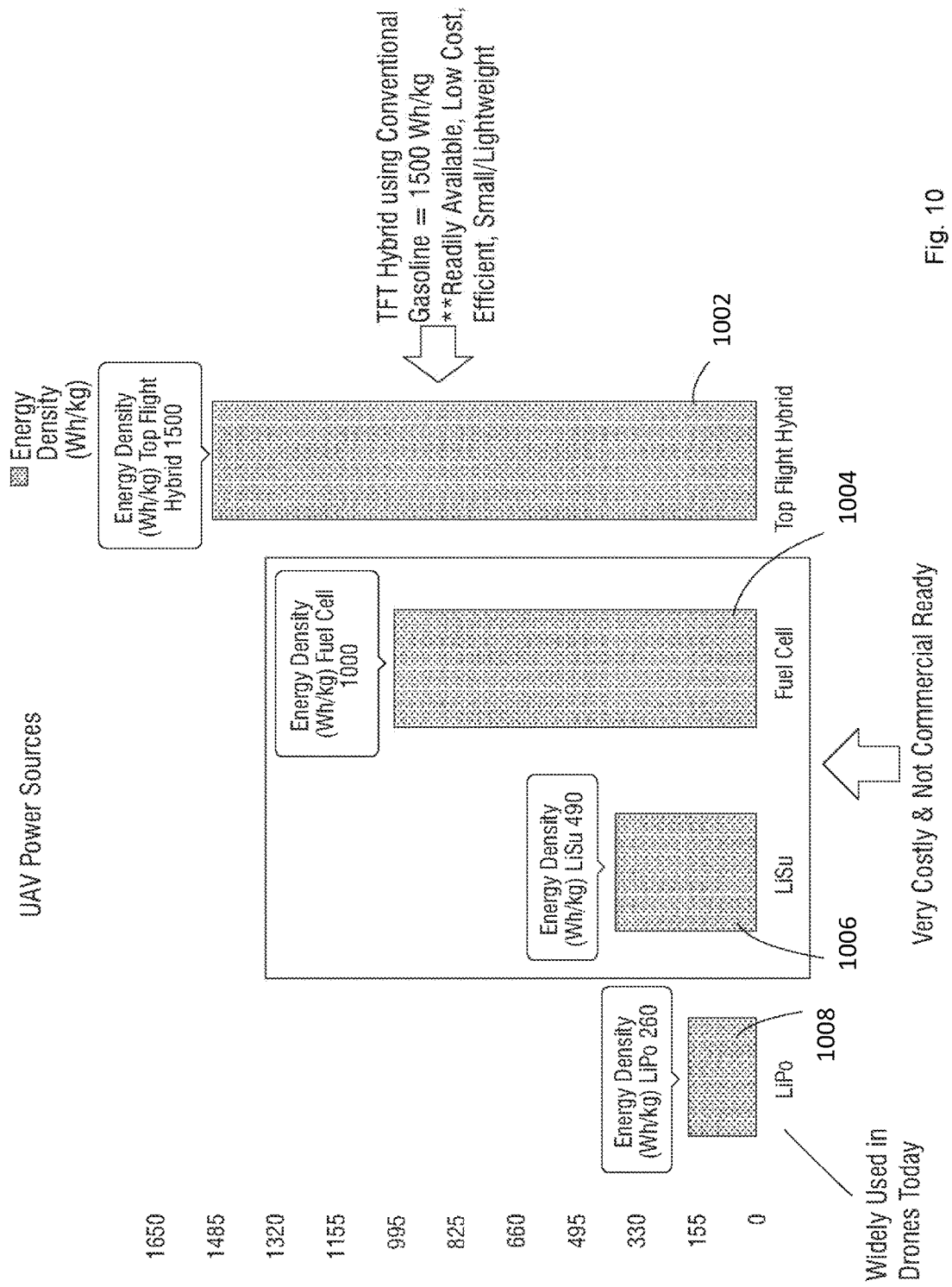
FIG. 10 depicts a graph comparing energy density of different UAV power sources.

FIG. 10 depicts a graph comparing energy density of different UAV power sources. In various embodiments, the hybrid generator system 500 can use conventional gasoline which is readily available at low cost and provide about 1,500 Wh/kg of power for UAV applications, e.g., as indicated at 1002 in FIG. 6. Conventional UAVs which rely entirely on batteries can provide a maximum energy density of about 1,000 Wh/kg when using an energy high density fuel cell technology, indicated at 1004 about 400 Wh/kg when using lithium sulfur batteries, indicated at 1006, and only about 200 Wh/kg when using a LiPo battery, indicated at 1008.

Figure 11:
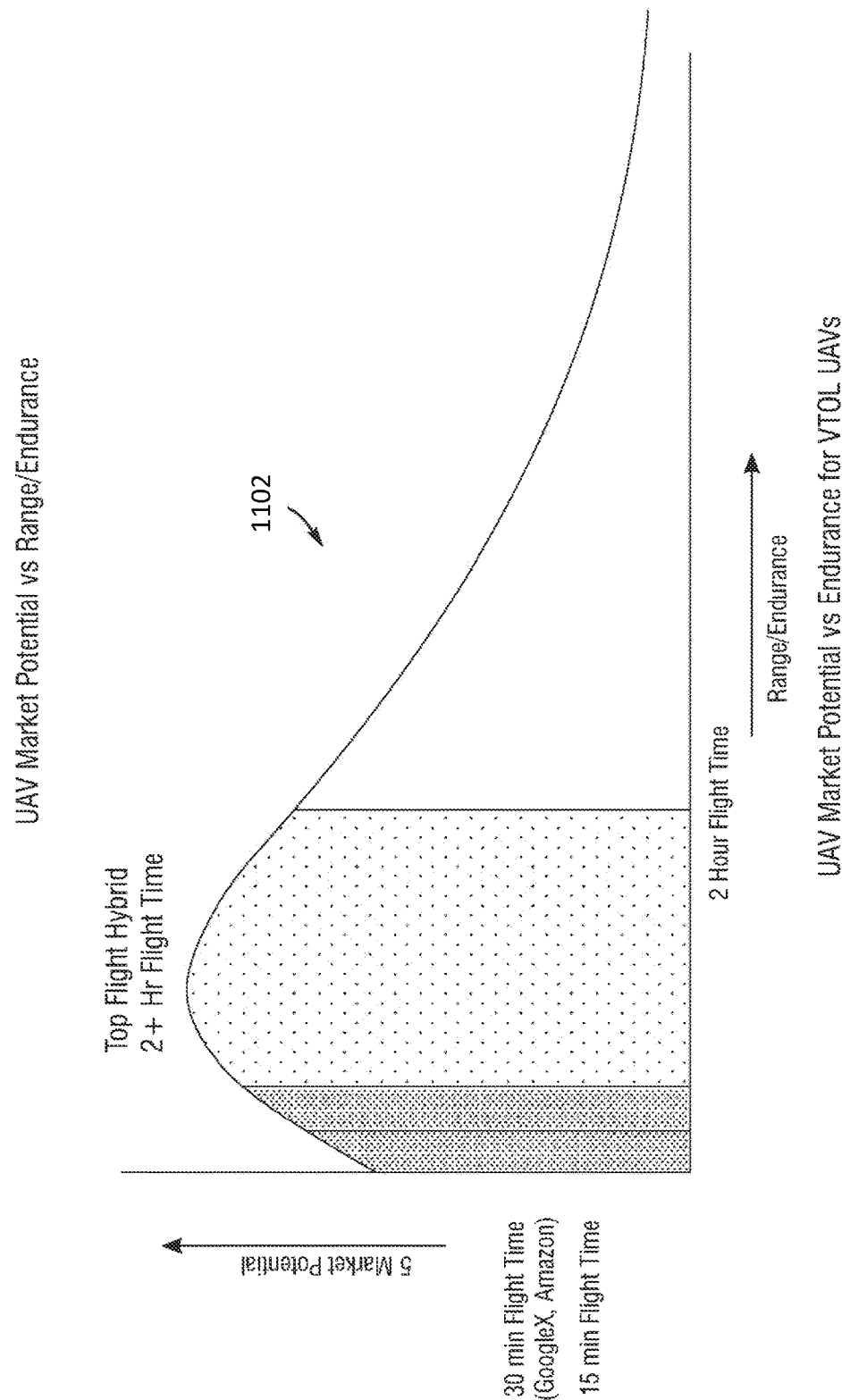
FIG. 11 depicts a graph of market potential for UAVs against flight time for an example two plus hours of flight time hybrid generator system of one or more embodiments when coupled to a UAV is able to achieve and an example of the total market potential vs. endurance for the hybrid generator system for UAVs.

FIG. 11 depicts a graph 1104 of market potential for UAVs against flight time for an example two plus hours of flight time hybrid generator system 500 of one or more when coupled to a UAV is able to achieve and an example of the total market potential vs. endurance for the hybrid generator system 500 for UAVs.

In various embodiments, the hybrid generator power systems 500 can be integrated as part of a UAV or similar type aerial robotic vehicle to perform as a portable flying generator using the primary source of power to sustain flight of the UAV and then act as a primary power source of power when the UAV has reached its destination and is not in flight. For example, when a UAV which incorporates hybrid system 10, e.g., UAV 900, FIG. 9, is not in flight, the available power generated by hybrid system can be transferred to one or more of external loads 518, 526, 528, and/or 536 such that hybrid generator system 500 operates as a portable generator. Hybrid system generator 500 can provide continuous peak power generation capability to provide power at remote and often difficult to reach locations. In the "non-flight portable generator mode", hybrid system 500 can divert the available power generation capability towards external one or more of loads 518, 526, 528, and/or 536. Depending on the power requirements, one or more of DC-to-AC inverters 522, 532 may be used to convert DC voltage to standard AC power (120 VAC or 240 VAC).

In operation, hybrid generator system 500 coupled to a UAV, such as UAV 900, FIG. 9, will be able to traverse from location to location using aerial flight, land, and switch on the power generator to convert fuel into power.

Figure 12:
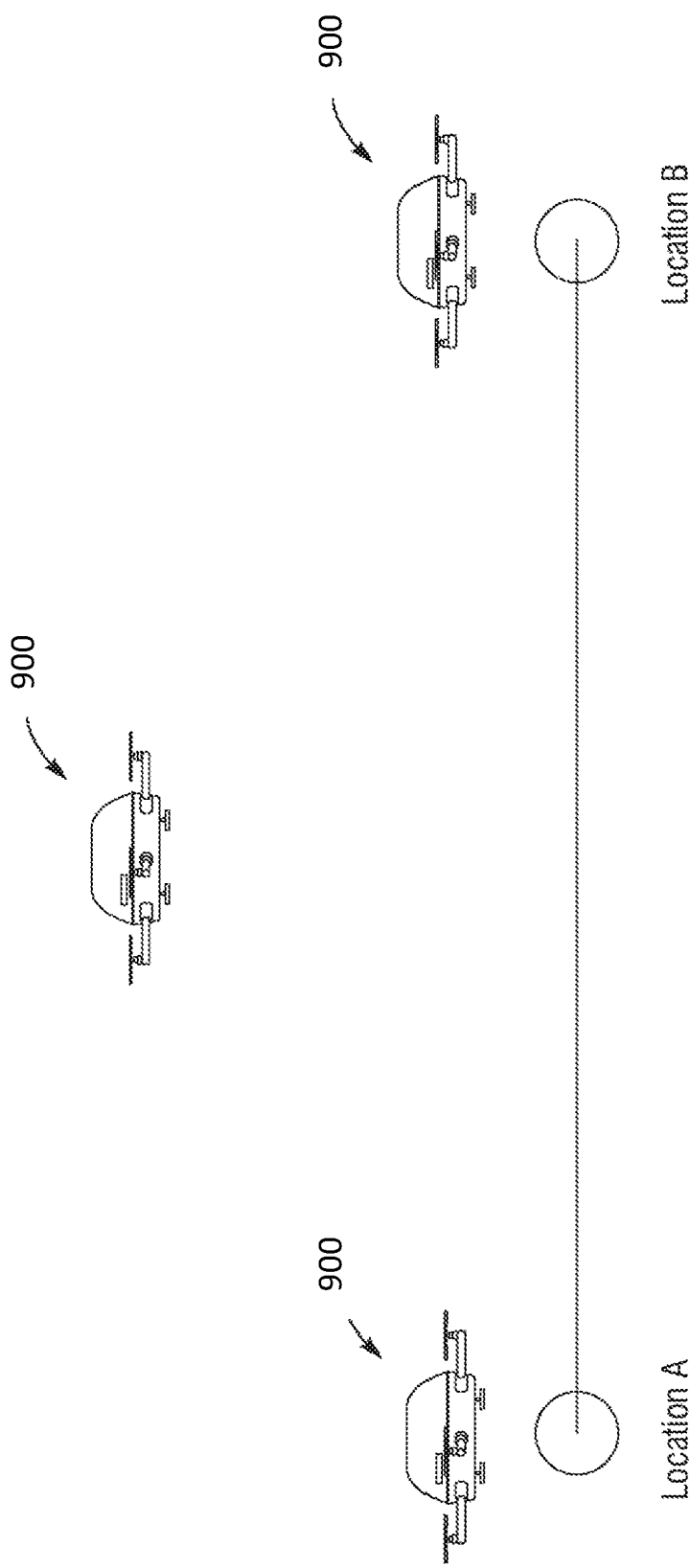
FIG. 12 shows an example flight pattern of a UAV with a hybrid generator system.

FIG. 12 shows an example flight pattern of a UAV with a hybrid generator system 500. In the example flight pattern shown in FIG. 12, the UAV 900, with hybrid system 500 coupled thereto, begins at location A loaded with fuel ready to fly. The UAV 900 then travels from location A to location B and lands at location B. The UAV 900 then uses hybrid system 500 to generate power for local use at location B, thereby acting as a portable flying generator. When power is no longer needed, the UAV 900 returns back to location A and awaits instructions for the next task.

In various embodiments, the UAV 900 uses the power provided by hybrid generator system 500 to travel from an initial location to a remote location, fly, land, and then generate power at the remote location. Upon completion of the task, the UAV 900 is ready to accept commands for its new task. All of this can be performed manually or through an autonomous/automated process. In various embodiments, the UAV 900 with hybrid generator system 500 can be used in an applicable application where carrying fuel and a local power generator are needed. Thus, the UAV 900 with a hybrid generator system 500 eliminates the need to carry both fuel and a generator to a remote location. The UAV 900 with a hybrid generator system 500 is capable of powering both the vehicle when in flight, and when not in flight can provide the same amount of available power to external loads. This may be useful in situations where power is needed for the armed forces in the field, in humanitarian or disaster relief situations where transportation of a generator and fuel is challenging, or in situations where there is a request for power that is no longer available.

Figure 13:
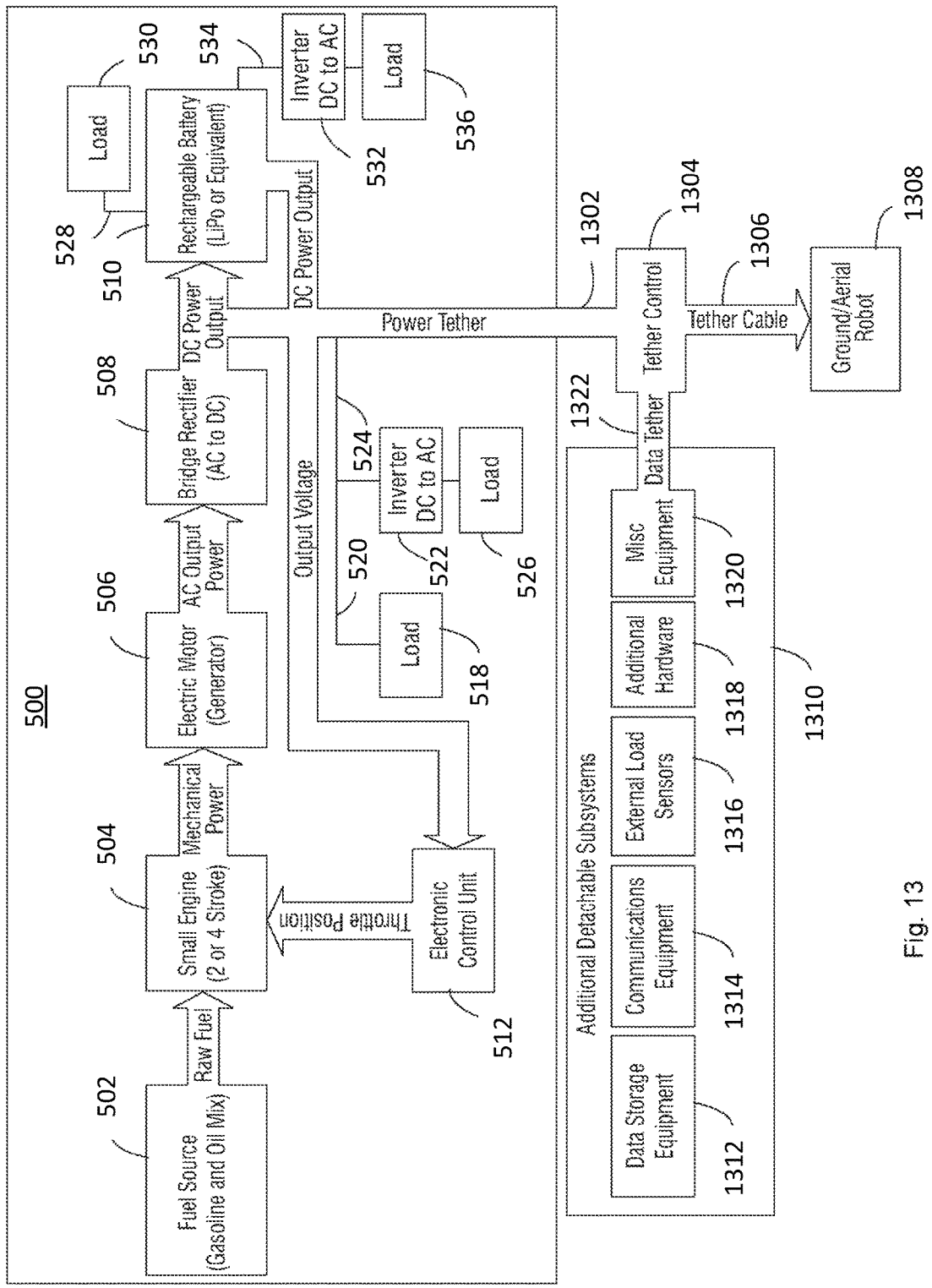
FIG. 13 depicts a diagram of a hybrid generator system with detachable subsystems.

FIG. 13 depicts a diagram of another system for a hybrid generator system 500 with detachable subsystems. FIG. 14A depicts a diagram of a hybrid generator system 500 with detachable subsystems integrated as part of a UAV. FIG. 14B depicts a diagram of a hybrid generator system 500 with detachable subsystems integrated as part of a ground robot. In various embodiments, a tether line 1302 is coupled to the DC output of bride rectifier 508 and rechargeable battery 510 of a hybrid control system 500. The tether line 1302 can provide DC power output to a tether controller 1304. The tether controller 1304 is coupled between a tether cable 1306 and a ground or aerial robot 1308. In operation, as discussed in further detail below, the hybrid generator system 500 provides tethered power to the ground or aerial robot 1308 with the similar output capabilities as discussed above with one or more of the FIGS. in this paper.

The system shown in FIG. 13 can include additional detachable components 1310 integrated as part of the system, e.g., data storage equipment 1312, communications equipment 1314, external load sensors 1316, additional hardware 1318, and various miscellaneous equipment 1320 that can be coupled via data tether 1322 to tether controller 1304.

In one example of operation of the system shown in FIG. 13, the system may be configured as part of a flying robot or UAV, such as flying robot or UAV 1402, FIG. 14, or as ground robot 1404. Portable tethered robotic system 1408 starts a mission at location A. All or an applicable combination of the subsystems and ground, the tether controller, ground/aerial robot 1308 can be powered by the hybrid generator system 500. The Portable tethered robotic system 1408 travels either by ground, e.g., using ground robot 1404 powered by hybrid generator system 500 or by air using flying robot or UAV 1402 powered by hybrid generator system 500 to desired remote location B. At location B, portable tethered robotic system 1408 configured as flying robot 1402 or ground robot 1404 can autonomously decouple hybrid generator system 500 and/or detachable subsystem 1310, indicated at 1406, which remain detached while ground robot 1404 or flying robot or UAV 1402 are operational. When flying robot or UAV 1402 is needed at location B, indicated at 1412, flying robot or UAV 1402 can be operated using power provided by hybrid generator system coupled to tether cable 1306. When flying robot or UAV 1402 no longer has hybrid generator system 500 and/or additional components 1310 attached thereto, it is significantly lighter and can be in flight for a longer period of time. In one example, flying robot or UAV 1402 can take off and remain in a hovering position remotely for extended periods of time using the power provided by hybrid generator system 500.

Similarly, when ground robot 1404 is needed at location B, indicated at 1410, it may be powered by hybrid generator system 500 coupled to tether line 1306 and will also be significantly lighter without hybrid generator system 500 and/or additional components 1310 attached thereto. Ground robot 1404 can also be used for extended periods of time using the power provide by hybrid generator system 500.

Figure 15:
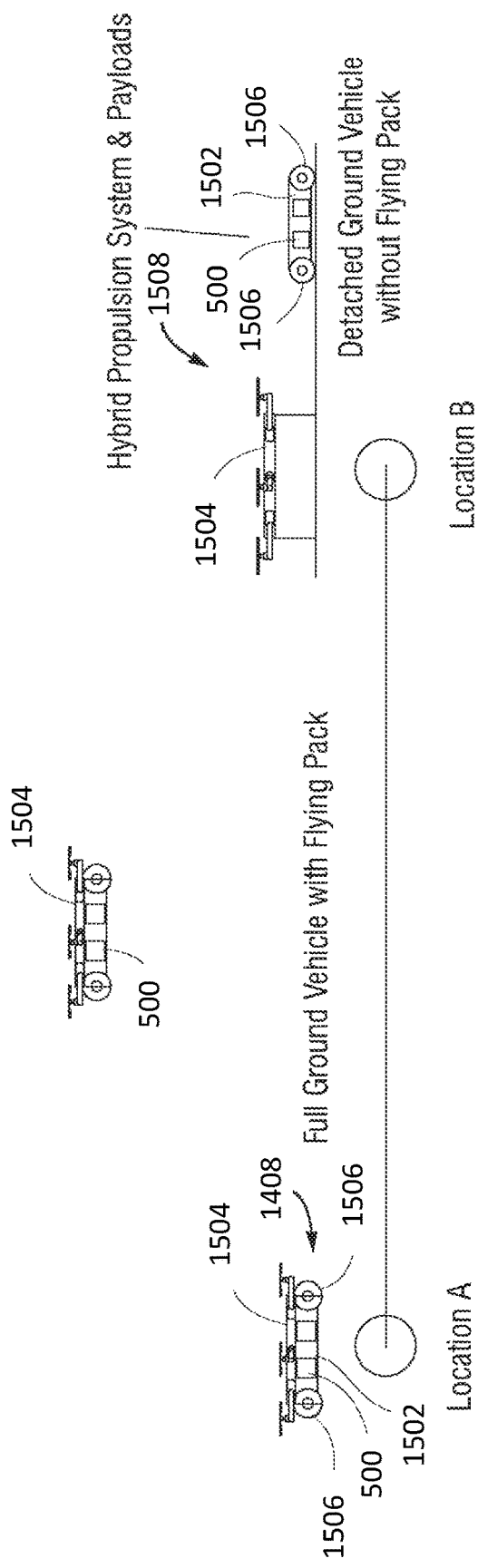
FIG. 15 shows a ground robot with a detachable flying pack in operation.

FIG. 15 shows a ground robot 1502 with a detachable flying pack in operation. The detachable flying pack 1504 includes hybrid generator system 500. The detachable flying pack is coupled to the ground robot 1502 of one or more embodiments. The hybrid generator system 500 is embedded within the ground robot 1502. The ground robot 1502 is detachable from the flying pack 1504. With such a design, a majority of the capability is embedded deep within the ground robot 1502 which can operate 100% independently of the flying pack 1504. When the ground robot 1502 is attached to the flying pack 1504, the flying pack 1504 is powered from hybrid generator system 500 embedded in the ground robot 1502 and the flying pack 1504 provides flight. The ground robot 1502 platform can be a leg wheel or threaded base motion.

In one embodiment, the ground robot 1502 may include the detachable flying pack 1504 and the hybrid generator system 500 coupled thereto as shown in FIG. 15. In this example, the ground robot 1502 is a wheel-based robot as shown by wheels 1506. In this example, the hybrid generator system 10, includes fuel source 502, engine 504, generator motor 506, bridge rectifier 508, rechargeable battery 20, ECU 512, and optional inverters 522 and 532, as discussed above with reference to one or more FIGS. in this paper. The hybrid generator system 500 also preferably includes data storage equipment 1312, communications equipment 1314, external load sensors 1316, additional hardware 1318, and miscellaneous communications 1320 coupled to data line 1322 as shown. The flying pack 1504 is preferably, an aerial robotic platform such as a fixed wing, single rotor or multi rotor, aerial device, or similar type aerial device.

In one embodiment, the ground robot 1502 and the aerial flying pack 1504 are configured as a single unit. Power is delivered the from hybrid generator system 500 and is used to provide power to flying pack 1504, so that ground robot 1502 and flying pack 1504 can fly from location A to location B. At location B, ground robot 1506 detaches from flying pack 1504, indicated at 1508, and is able to maneuver and operate independently from flying pack 1504. Hybrid generator system 500 is embedded in ground robot 1502 such that ground robot 1506 is able to be independently powered from flying pack 1504. Upon completion of the ground mission, ground robot 1502 is able to reattached itself to flying pack 1504 and return to location A. All of the above operations can be manual, semi-autonomous, or fully autonomous.

In one embodiment, flying pack 1504 can traverse to a remote location and deliver ground robot 1502. At the desired location, there is no need for flying pack 1504 so it can be left behind so that ground robot 1502 can complete its mission without having to carry flying pack 1504 as its payload. This may be useful for traversing difficult and challenging terrains, remote locations, and in situations where it is challenging to transport ground robot 1502 to the location. Exemplary applications may include remote mine destinations, remote surveillance and reconnaissance, and package delivery services where flying pack 1504 cannot land near an intended destination. In these examples, a designated safe drop zone for flying pack can be used and local delivery is completed by ground robot 1502 to the destination.

In various embodiments, then a mission is complete, ground robot 1404 or flying robot or UAV 1402 can be autonomously coupled back to hybrid generator system 500. Additional detachable components 1310 can auto be autonomously coupled back hybrid generator system 500. Portable tethered robotic system 1408 with a hybrid generator system 500 configured a flying robot or UAV 1402 or ground robot 1404 then returns to location A using the power provided by hybrid generator system 500.

The result is portable tethered robotic system 1408 with a hybrid generator system 500 is able to efficiently transport ground robot 1404 or flying robot or UAV 1402 to remote locations, automatically decouple ground robot 1404 or flying robot or UAV 1402, and effectively operate the flying robot 1402 or ground robot 1404 using tether power where it may be beneficial to maximize the operation time of the ground robot 1402 or flying robot or UAV 1404. System 1408 provides modular detachable tethering which may be effective in reducing the weight of the tethered ground or aerial robot thereby reducing its power requirements significantly. This allows the aerial robot or UAV or ground robot to operate for significantly longer periods of time when compared to the original capability where the vehicle components are attached and the vehicle needs to sustain motion. System 1408 eliminates the need to assemble a generator, robot and tether at remote locations and therefore saves time, resources, and expense. Useful applications of system 1408 may include, inter alia, remote sensing, offensive or defensive military applications and/or communications networking, or multi-vehicle cooperative environments, and the like.

Figure 16:
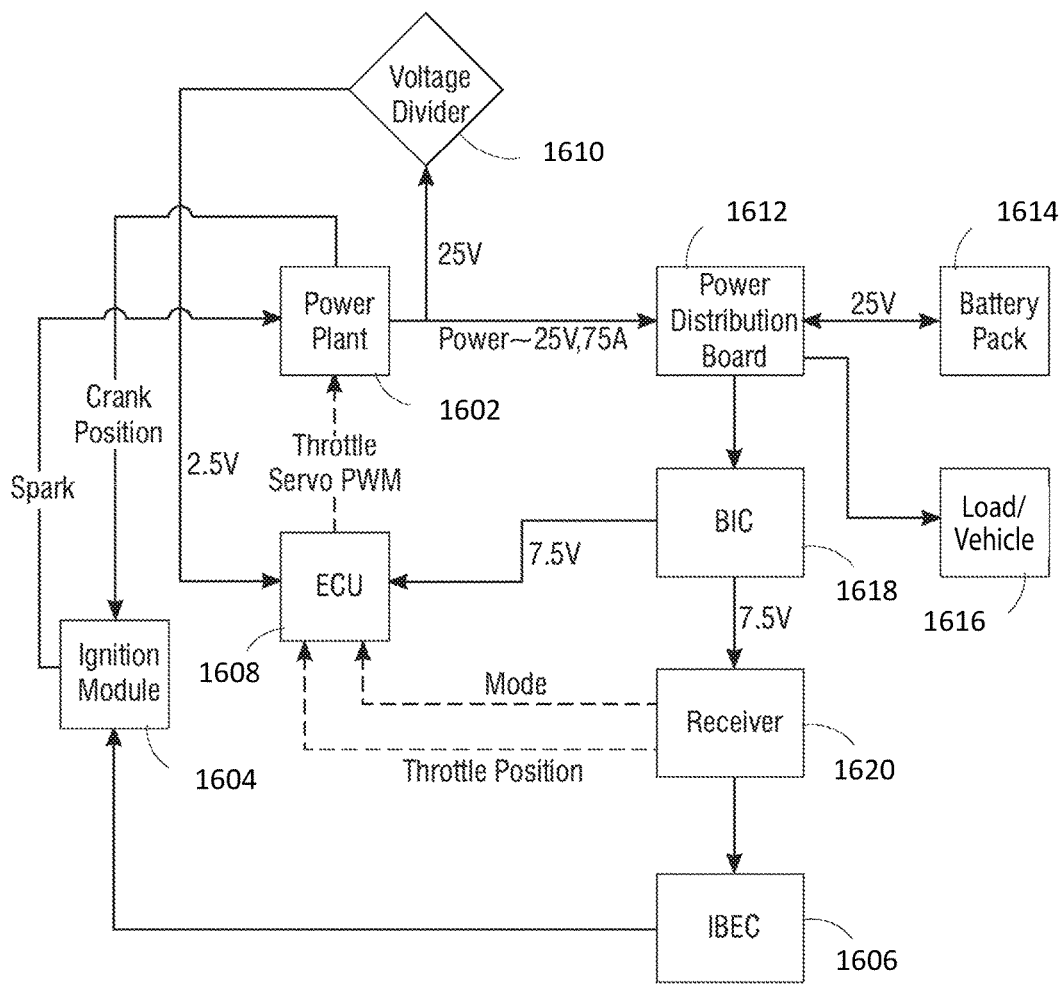
FIG. 16 shows a control system of a hybrid generator system.

FIG. 16 shows a control system of a hybrid generator system. The hybrid generator system includes a power plant 1602 coupled to an ignition module 1604. The ignition module 1604 functions to start the power plant 1602 by providing a physical spark to the power plant 1604. The ignition module 1604 is coupled to an ignition battery eliminator circuit (IBEC) 1606. The IBEC 1606 functions to power the ignition module 1604.

In some examples, the ignition module 1604 is powered directly from the output of the bridge rectifier through a DC/DC converter rather than using the IBEC 1606. For instance, powering the ignition module 1604 by the bridge rectifier output can be used for power generation systems producing at least about 10 kW of power.

The power plant 1602 is configured to provide power. The power plant 1602 includes an engine and a generator. The power plant is controlled by the ECU 1608. The ECU 1608 is coupled to the power plant through a throttle servo. The ECU 1608 can operate the throttle servo to control a throttle of an engine to cause the power plant 1602 to either increase or decrease an amount of produced power. The ECU 1608 is coupled to a voltage divider 1610. Through the voltage divider 1610, the ECU can determine an amount of power the ECU 1608 is generating to determine whether to increase, decrease, or keep a throttle of an engine constant.

The power plant is coupled to a power distribution board 1612. The power distribution board 1612 can distribute power generated by the power plant 1602 to either or both a battery pack 1614 and a load/vehicle 1616. The power distribution board 1612 is coupled to a battery eliminator circuit (BEC) 1618. The BEC 1618 provides power to the ECU 1608 and a receiver 1620. The receiver 1620 controls the IBEC 1606 and functions to cause the IBEC 1606 to power the ignition module 1604. The receiver 1620 also sends information to the ECU 1608 used in controlling a throttle of an engine of the power plant 1602. The receiver 1620 to the ECU information related to a throttle position of a throttle of an engine and a mode in which the hybrid generation system is operating. In some examples, when the IBEC is not used, the receiver 1620 is used to directly enable or disable the ignition module 1604.

Figure 17:
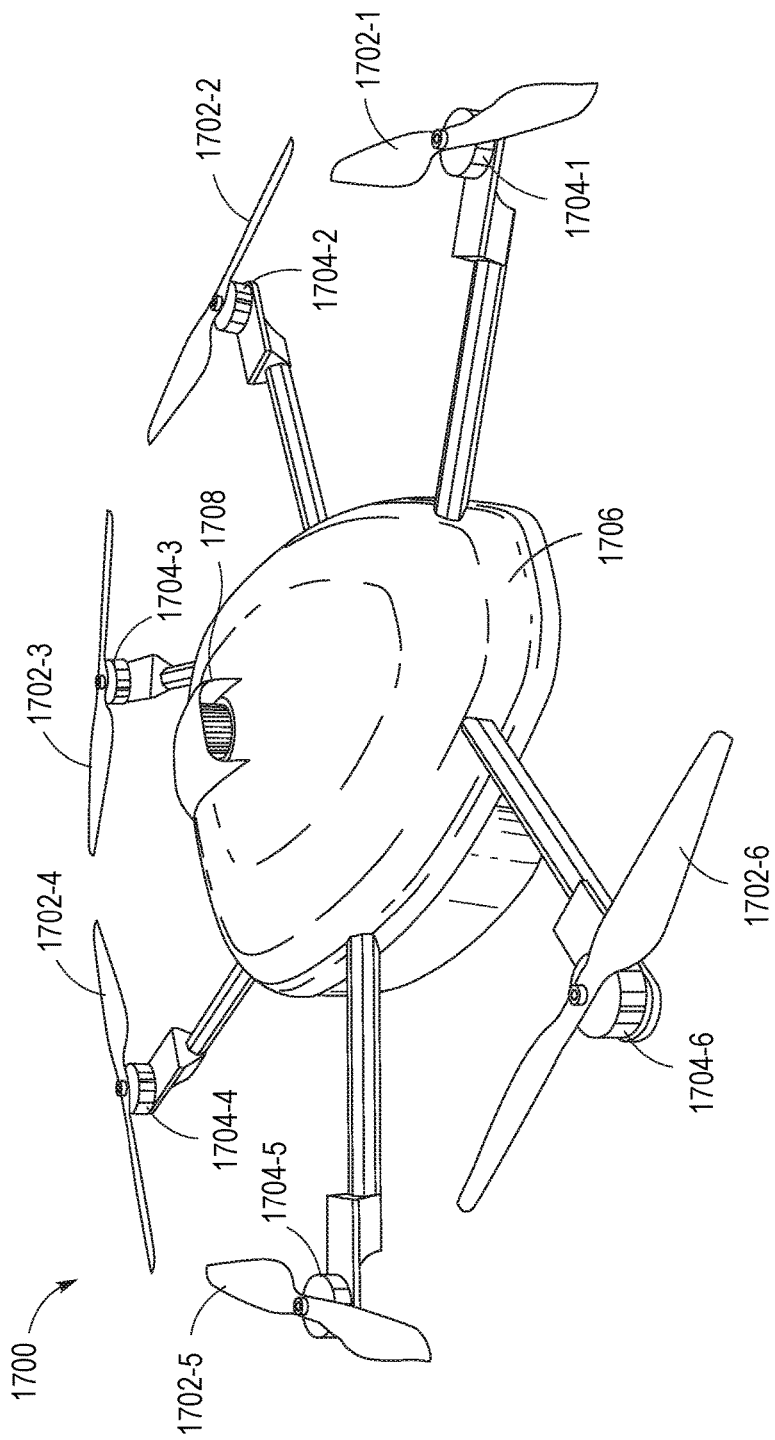
FIGS. 17-19 are diagrams of a UAV.

FIG. 17 shows a top perspective view of a top portion 1700 of a drone powered through a hybrid generator system. The top portion 1700 of the drone shown in FIG. 13 includes six rotors 1702-1 . . . 1702-6 (hereinafter "rotors 1702"). The rotors 1702 are caused to spin by corresponding motors 1704-1 . . . 1704-6 (hereinafter "motors 1704"). The motors 1704 can be powered through a hybrid generator system. The top portion 1700 of a drone includes a top surface 1706. Edges of the top surface 1706 can be curved to reduce air drag and improve aerodynamic performance of the drone. The top surface includes an opening 1708 through which air can flow to aid in dissipating heat away from at least a portion of a hybrid generator system. In various embodiments, at least a portion of an air filter is exposed through the opening 1708.

Figure 18:
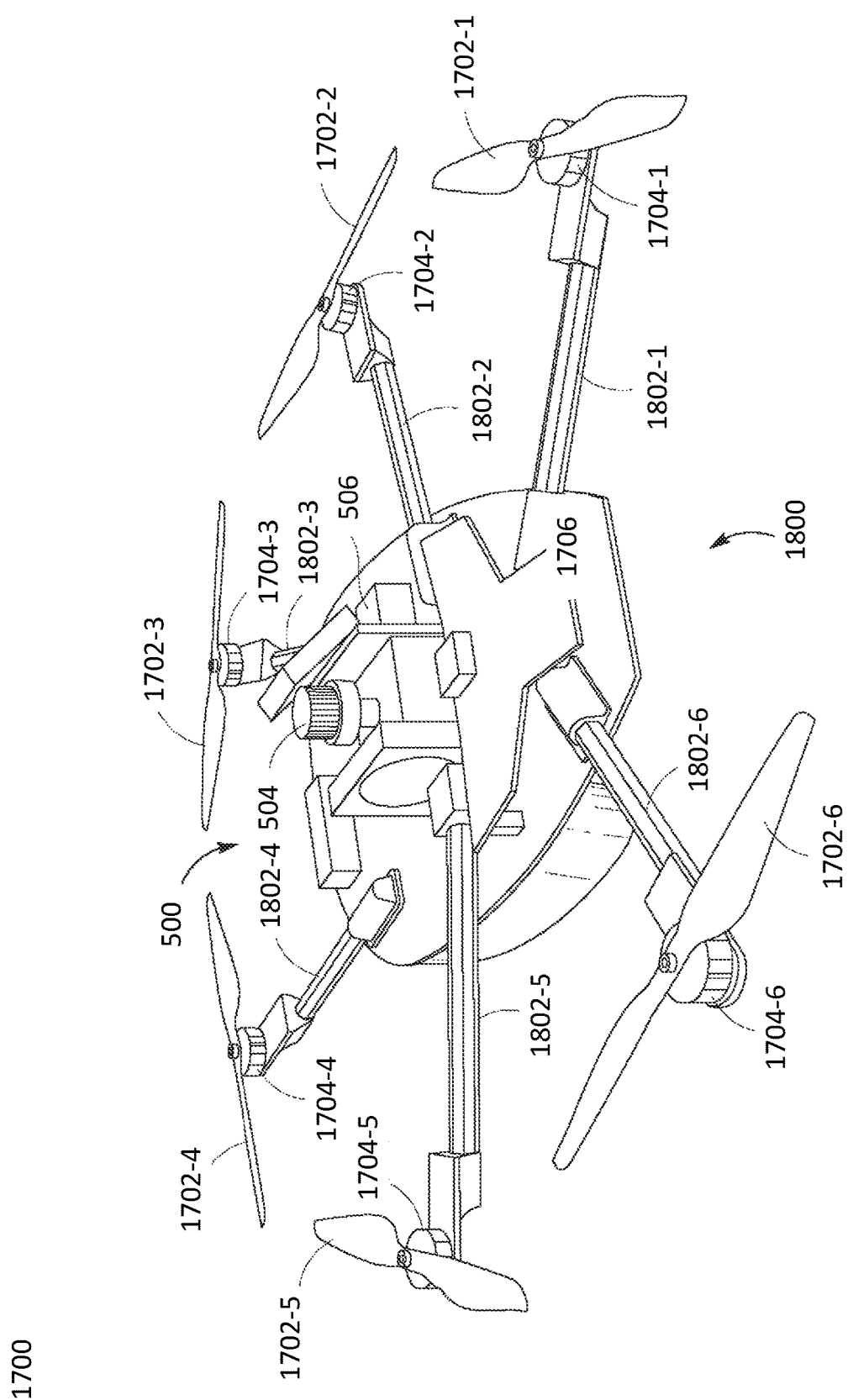

FIG. 18 shows a top perspective view of a bottom portion 1800 of a drone powered through a hybrid generator system 500. The hybrid generator system 500 includes an engine 504 and a generator motor 506 to provide power to motors 1704. The rotor motors 1704 and corresponding rotors 1702 are positioned away from a main body of a bottom portion 1800 of the drone through arms 1802-1 . . . 1802-6 (hereinafter "arms 1802"). An outer surface of the bottom portion of the bottom portion 1800 of the drone and/or the arms 1802 can have edges that are curved to reduce air drag and improve aerodynamic performance of the drone.

Figure 19:
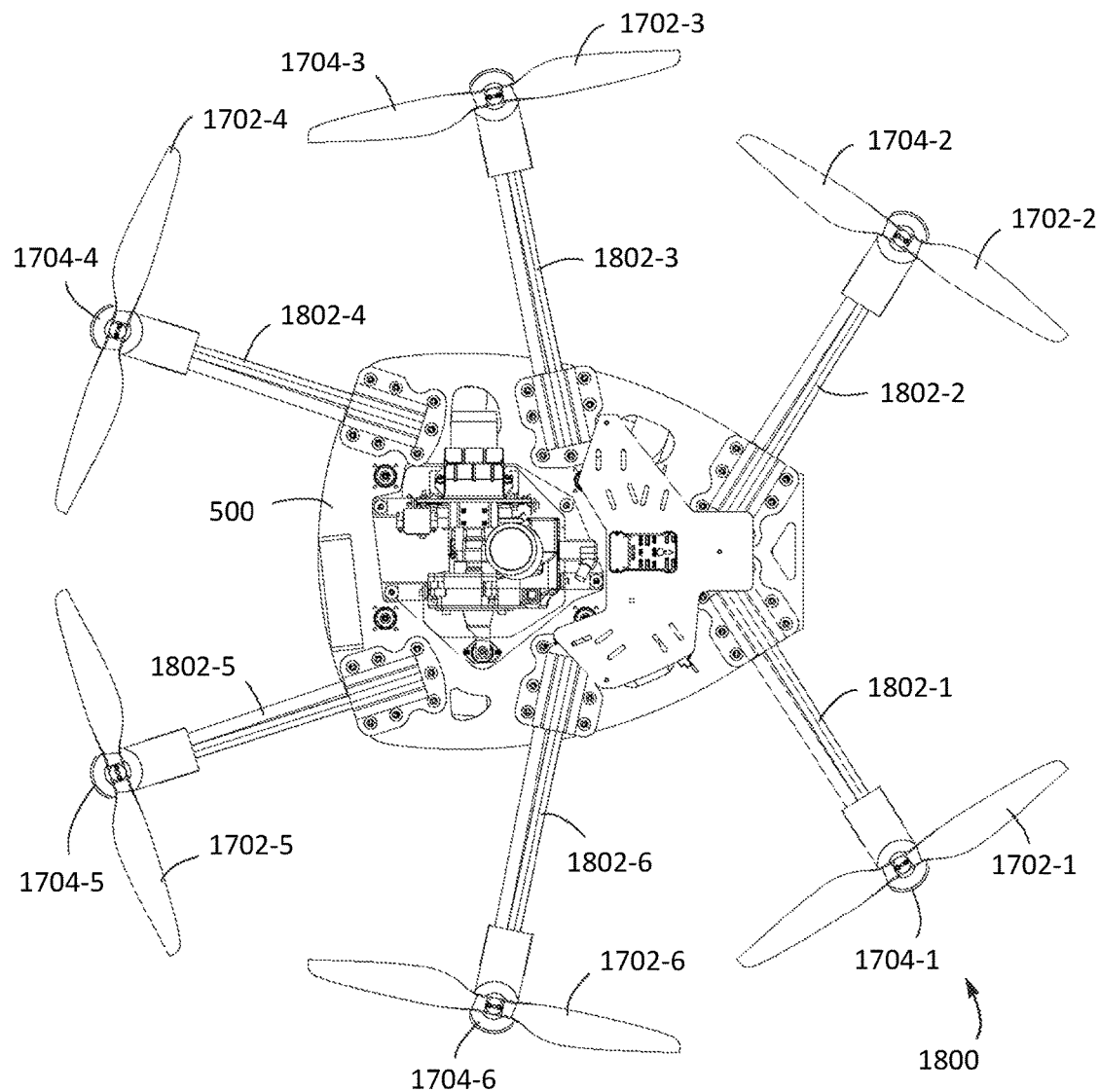

FIG. 19 shows a top view of a bottom portion 1800 of a drone powered through a hybrid generator system 500. The rotor motors 1704 and corresponding rotors 1702 are positioned away from a main body of a bottom portion 1800 of the drone through arms 1802. An outer surface of the bottom portion of the bottom portion 1800 of the drone and/or the arms 1802 can have edges that are curved to reduce air drag and improve aerodynamic performance of the drone.

Figure 20:
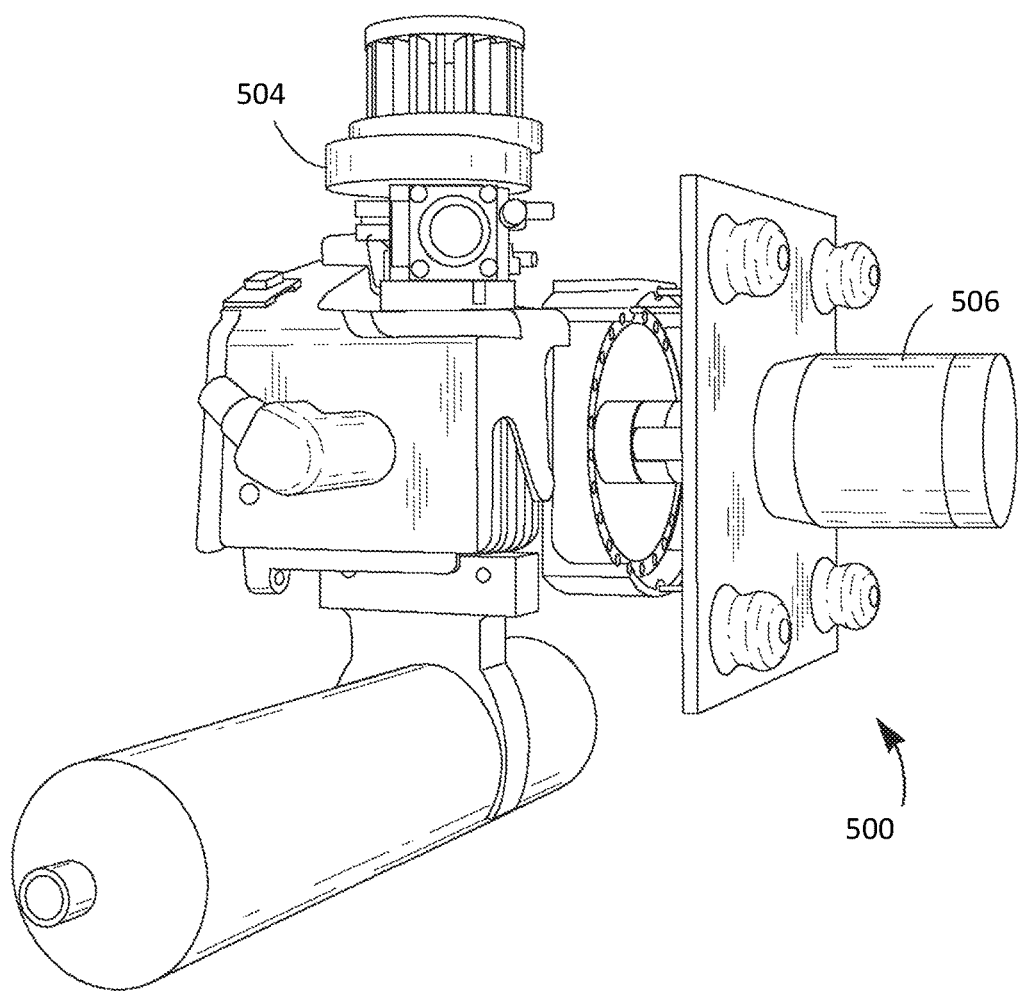
FIGS. 20 and 21 are diagrams of portions of a hybrid generator system.

FIG. 20 shows a side perspective view of a hybrid generator system 500. The hybrid generator system 500 shown in FIG. 16 is capable of providing 1.8 kW of power. The hybrid generator system 500 include an engine 504 coupled to a generator motor 506. The engine 504 can provide approximately 3 horsepower. The generator motor 506 functions to generate AC output power using mechanical power generated by the engine 504.

Figure 21:
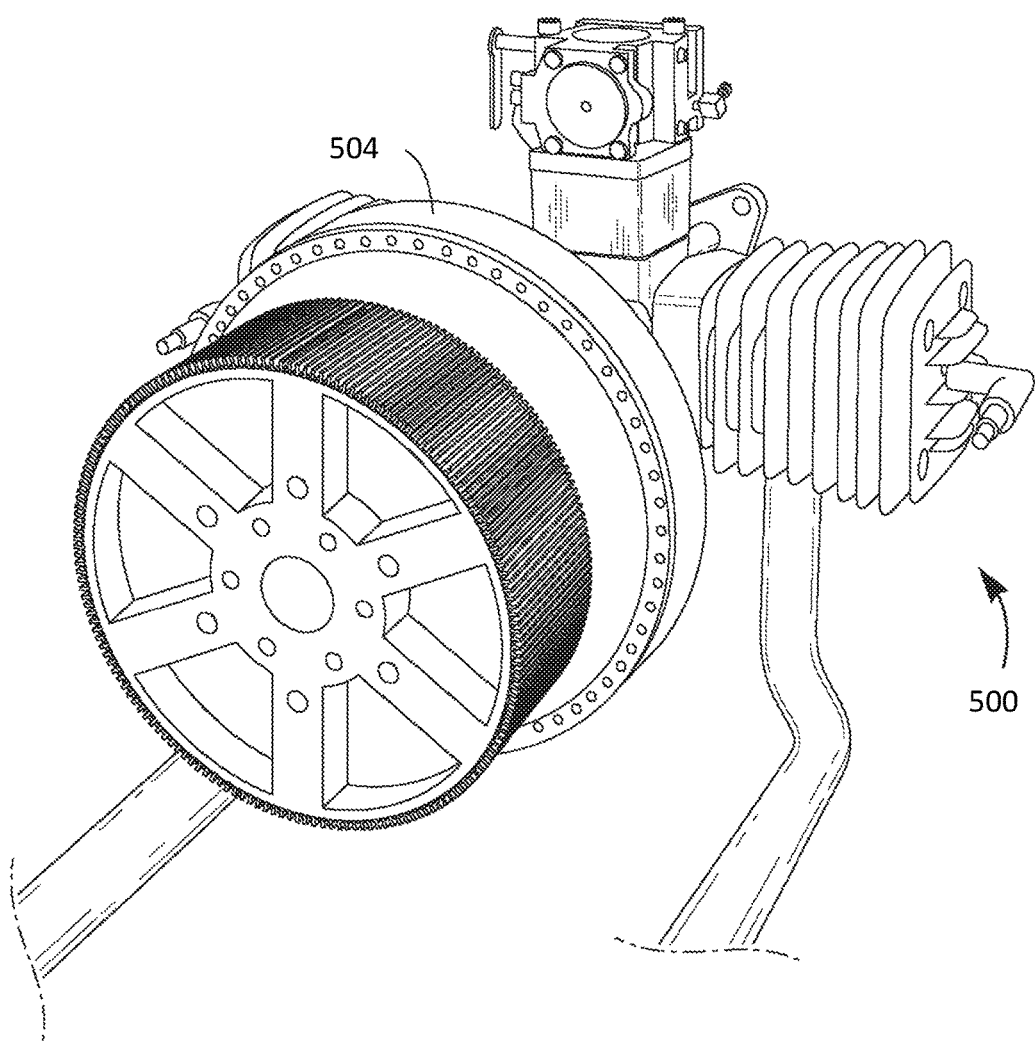

FIG. 21 shows a side perspective view of a hybrid generator system 500. The hybrid generator system 500 shown in FIG. 17 is capable of providing 10 kW of power. The hybrid generator system 500 include an engine 504 coupled to a generator motor. The engine 504 can provide approximately 15-16.5 horsepower. The generator motor functions to generate AC output power using mechanical power generated by the engine 504.

Further description of UAVs and hybrid generator systems can be found in U.S. application Ser. No. 14/942,600, the contents of which are incorporated here by reference in their entirety.

In some examples, the engine 504 can include features that enable the engine to operate with high power density. The engine 504 can be a two-stroke engine having a high power-to-weight ratio. The engine 504 can embody a simply design with a small number of moving parts such that the engine is small and light, thus contributing to the high power-to-weight ratio of the engine. In a specific example, the engine has an energy density of 1 kW/kg (kilowatt per kilogram) and generates about 10 kg of lift for every kilowatt of power generated by the engine. In some examples, the engine 504 can be coupled to a brushless DC motor or a permanent magnet synchronous motor, which can contribute to achieving a high power density of the engine. For instance, a brushless motor is efficient and reliable, and is generally not prone to sparking, thus reducing the risk of electromagnetic interference (EMI) from the engine.

In some examples, the engine 504 is mounted on the UAV via a vibration isolation system that enables sensitive components of the UAV and data center to be isolated from vibrations generated by the engine. Sensitive components of the UAV can include, e.g., an inertial measurement unit such as Pixhawk, a compass, a global positioning system (GPS), or other components. Sensitive components of the data center can include, e.g., processors, data storage devices, wireless communications components, or other components.

In some examples, the vibration isolation system can include vibration damping mounts that attach the engine to the frame of the UAV. The vibration damping mounts allow for the engine 504 to oscillate independently from the frame of the UAV, thus preventing vibrations from being transmitted from the engine to other components of the UAV. The vibration damping mounts can be formed from a robust, energy absorbing material such as rubber, that can absorb the mechanical energy generated by the motion of the engine without tearing or ripping, thus preventing the mechanical energy from being transferred to the rest of the UAV. In some examples, the vibration damping mounts can be formed of two layers of rubber dampers joined together rigidly with a spacer. The length of the spacer can be adjusted to achieve a desired stiffness for the mount. The hardness of the rubber can be adjusted to achieve desired damping characteristics in order to absorb vibrational energy.

Referring to FIG. 22A, in some examples, the engine 504 and the generator motor 506 are directly coupled through a precise and robust connection, e.g., through a rigid metal coupling or a urethane coupling 704. For instance, the rigid metal coupling can include bolted aluminum plates that are stable against operation at high rpm, pulse loading, and shocks. In particular, the generator motor 506 includes a generator rotor 706 and a generator stator 708 housed in a generator body 2202. The generator rotor 706 is attached to the generator body 2202 by generator bearings 2204. The generator rotor 706 is coupled to an engine shaft 606 via the coupling 704. Precision coupling between the engine 504 and the generator motor 506 can be achieved by using precisely machined parts and balancing the weight and support of the rotating components of the generator motor 506, which in turn reduces internal stresses. Alignment of the rotor of the generator with the engine shaft can also help to achieve precision coupling. Misalignment between the rotor and the engine shaft can cause imbalances that can reduce efficiency and potentially lead to premature failure. In some examples, alignment of the rotor with the engine shaft can be achieved using precise indicators and fixtures. Precision coupling can be maintained by cooling the engine 504 and generator motor 506, by reducing external stresses, and by running the engine 504 and generator motor 506 under steady conditions, to the extent possible. For instance, the vibration isolation mounts allow external stresses on the engine 504 to be reduced or substantially eliminated, assisting in achieving precision direct coupling.

Direct coupling can contribute to the reliability of the first power system, which in turn enables the hybrid generator system to operate continuously for long periods of time at high power. In addition, direct coupling can contribute to the durability of the first power system, thus helping to reduce mechanical creep and fatigue even over many engine cycles, such as millions of engine cycles. In some examples, the engine is mechanically isolated from the frame of the UAV by the vibration isolation system and thus experiences minimal external forces, so the direct coupling between the engine and the generator motor can be implemented by taking into account only internal stresses.

Direct coupling between the engine 504 and the generator motor 506 can enable the first power system to be a compact, lightweight power system having a small form factor. A compact and lightweight power system can be readily integrated into the UAV.

Figure 22B:
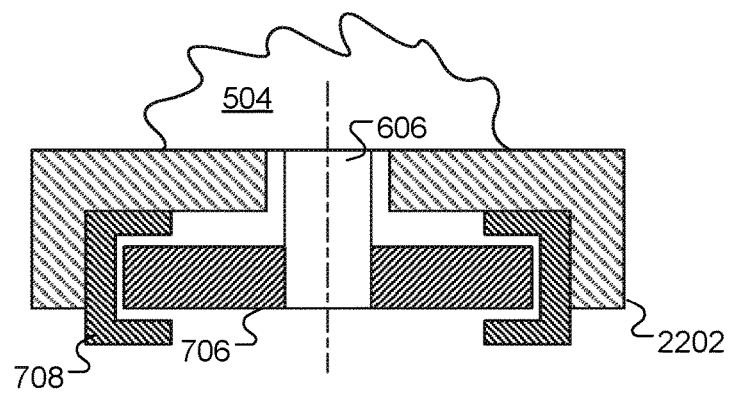
Figure 23:
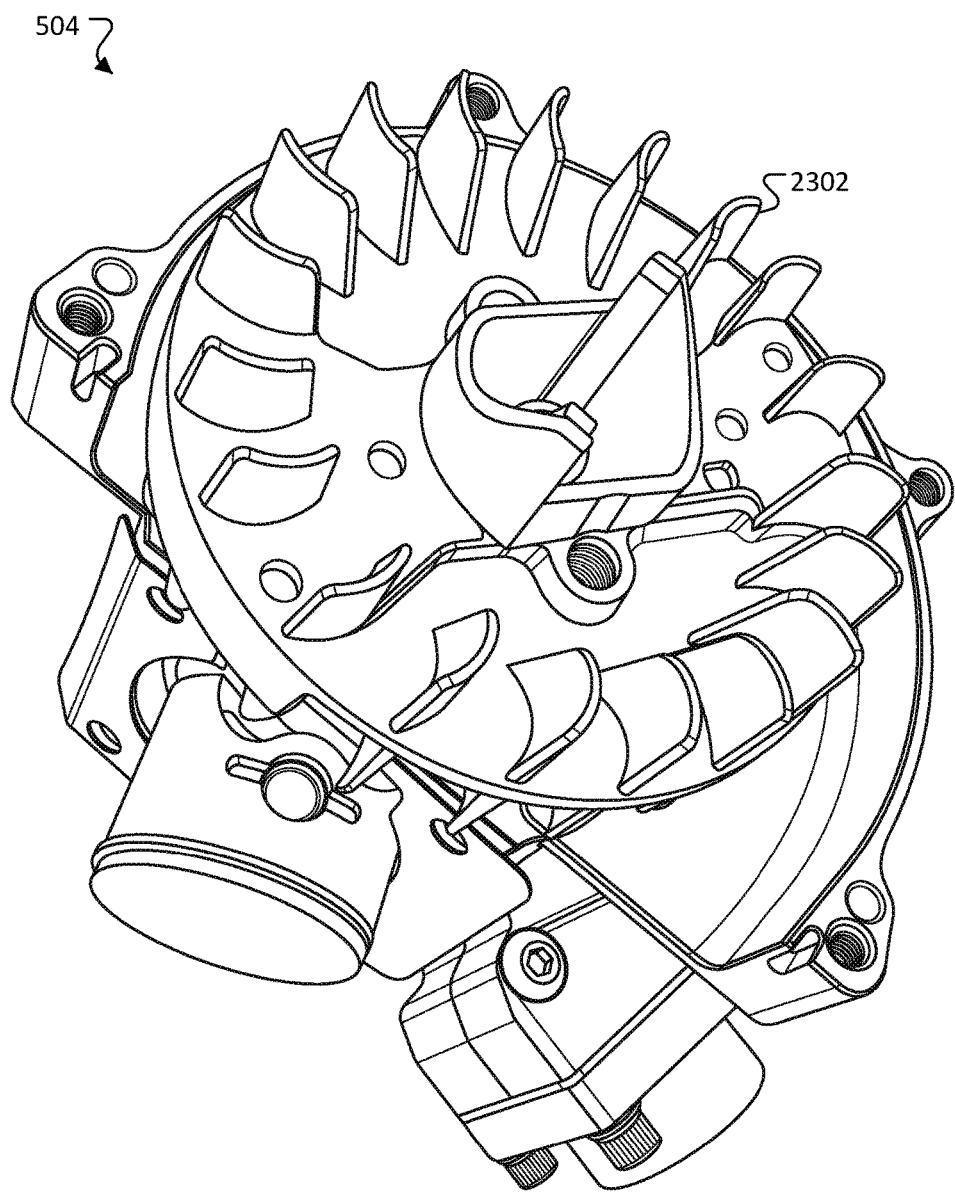
FIG. 23 is a diagram of a portion of an engine.

Referring to FIG. 22B, in some examples, a frameless or bearing-less generator 608 can be used instead of a urethane coupling between the generator motor 506 and the engine 504. For instance, the bearings (2204 in FIG. 22A) on the generator can be removed and the generator rotor 706 can be directly mated to the engine shaft 606. The generator stator 708 can be fixed to a frame 610 of the engine 516. This configuration prevents over-constraining the generator with a coupling while providing a small form factor and reduced weight and complexity.

In some examples, compliant or flexible couplings can be provided as splined shafts, CV joints, UV joints, and/or for other UAV components. Such compliant couplings can be relevant for use with larger UAV systems, such as UAV systems sized to carry passengers. Compliant or flexible coupling reduce the requirement for precise alignment of the engine and generator shafts.

In some examples, the generator motor 506 includes a flywheel that provides a large rotational moment of inertia. A large rotational inertia can result in reduced torque spikes and smooth power output, thus reducing wear on the coupling between the engine 504 and the generator motor 506 and contributing to the reliability of the first power system. In some examples, the generator, when mated directly to the engine 504, acts as a flywheel. In some examples, the flywheel is a distinct component, e.g., if the generator does not provide enough rotary inertia.

In some examples, design criteria are set to provide good pairing between the engine 504 and the generator motor 506. The power band of a motor is typically limited to a small range. This power band can be used to identify an RPM (revolutions per minute) range within which to operate under most flight conditions. Based on the identified RPM range, a generator can be selected that has a motor constant (kV) that is able to provide the appropriate voltage for the propulsion system (e.g., the rotors). The selection of an appropriate generator helps to ensure that the voltage out of the generator will not drop as the load increases. For instance, if the engine has maximum power at 6500 RPM, and a 50 V system is desired for propulsion, then a generator can be selected that has a kV of 130.

In some examples, exhaust pipes can be designed to positively affect the efficiency of the engine 504. Exhaust pipes serve as an expansion chamber for exhaust from the engine, thus improving the volumetric efficiency of the engine. The shape of the exhaust pipes can be tuned to guide air back into the combustion chamber based on the resonance of the system. In some examples, the carburetor can also be tuned based on operating parameters of the engine, such as temperature or other parameters. For instance, the carburetor can be tuned to allow a desired amount of fuel into the engine, thus enabling a target fuel to air ratio to be reached in order to achieve a good combustion reaction in the engine. In addition, the throttle body can be designed to control fuel injection and/or timing in order to further improve engine output.

In some examples, the throttle of the engine can be regulated in order to achieve a desired engine performance. For instance, when the voltage of the system drops under a load, the throttle is increased; when the voltage of the system becomes too high, the throttle is decreased. The bus voltage can be regulated and a feedback control loop used to control the throttle position. In some examples, the current flow into the battery can be monitored with the goal of controlling the charge of the battery and the propulsion voltage. In some examples, feed forward controls can be provided such that the engine can anticipate upcoming changes in load (e.g., based on a mission plan and/or based on the load drawn by the motor) and preemptively compensates for the anticipated changes. Feed forward controls enable the engine to respond to changes in load with less lag. In some examples, the engine can be controlled to charge the battery according to a pre-specified schedule, e.g., to maximize battery life, in anticipation of loads (e.g., loads forecast in a mission plan), or another goal. Throttle regulation can help keep the battery fully charged, helping to ensure that the system can run at a desired voltage and helping to ensure that backup power is available.

In some examples, ultra-capacitors can be incorporated into the hybrid generator system in order to allow the hybrid generator system to respond quickly to changing power demands. For instance, ultra-capacitors can be used in conjunction with one or more rechargeable batteries to provide a lightweight system capable of rapid response and smooth, reliable power.

In some examples, thermal management strategies can be employed in order to actively or passively cool components of the hybrid generator system. High power dense components tend to overheat, e.g., because thermal dissipation is usually proportional to surface area. In addition, internal combustion is an inherently inefficient process, which creates heat.

Active cooling strategies can include fans, such as a centrifugal fan. The centrifugal fan can be coupled to the engine shaft so that the fan spins at the same RPM as the engine, thus producing significant air flow. The centrifugal fan can be positioned such that the air flow is directed over certain components of the engine, e.g., the hottest parts of the engine, such as the cylinder heads. Air flow generated by the flying motion of the UAV can also be used to cool the hybrid generator system. For instance, air pushed by the rotors of the UAV (referred to as propwash) can be used to cool components of the hybrid generator system. Passive cooling strategies can used alone or in combination with active cooling strategies in order to cool components of the hybrid generator system. In some examples, one or more components of the hybrid generator system can be positioned in contact with dissipative heat sinks, thus reducing the operating temperature of the components. For instance, the frame of the UAV can be formed of a thermally conductive material, such as aluminum, which can act as a heat sink. Referring to FIG. 22, in some examples, fins 2302 can be formed on the engine (e.g., on one or more of the cylinder heads of the engine) to increase the convective surface area of the engine, thus enabling increased heat transfer. In some examples, the hybrid generator system can be configured such that certain components are selectively exposed to ambient air or to air flow generated by the flying motion of the UAV in order to further cool the components.

In some examples, the materials of the hybrid generator system 10, the UAV, and/or the data center components can be lightweight. For instance, materials with a high strength to weight ratio can be used to reduce weight. Example materials can include aluminum or high strength aluminum alloys (e.g., 7075 alloy), carbon fiber based materials, or other materials. Component design can also contribute to weight reduction. For instance, components can be designed to increase the stiffness and reduce the amount of material used for the components. In some examples, components can be designed such that material that is not relevant for the functioning of the component is removed, thus further reducing the weight of the component.

Other embodiments are within the scope of the following claims.

We claim:

1. An unmanned aerial vehicle comprising:
    at least one rotor motor configured to drive at least one propeller to rotate;
    a passenger compartment sized to contain a human or animal passenger, the at least one propeller configured to generate lift sufficient to carry the human or animal passenger; and
    a hybrid generator system configured to provide electrical energy to the at least one rotor motor, the hybrid generator system comprising:
        a rechargeable battery configured to provide electrical energy to the at least one rotor motor;
        an engine configured to generate mechanical energy;
        a generator motor configured to generate electrical energy from the mechanical power generated by the engine; and
        a coupling device directly coupling a rotor of the engine to the generator motor, the coupling device including a flexible coupling incorporating a cooling device.

2. The unmanned aerial vehicle of claim 1, wherein the electrical energy generated by the generator motor is provided to at least one of the rotor motor and the rechargeable battery.

3. The unmanned aerial vehicle of claim 1, comprising a climate control system configured to control one or more of a temperature, a humidity, and an oxygen content within the passenger compartment.

4. The unmanned aerial vehicle of claim 3, in which the climate control system receives electrical energy from one or more of the generator motor and the rechargeable battery.

5. The unmanned aerial vehicle of claim 1, comprising a control system configured to enable the passenger to cause the unmanned aerial vehicle to land.

6. The unmanned aerial vehicle of claim 5, in which the control system is configured to receive information indicative of a destination from the passenger.

7. The unmanned aerial vehicle of claim 5, in which the control system is configured to receive operating instructions from a remote control center.

8. The unmanned aerial vehicle of claim 1, wherein the passenger sized compartment is positioned on a top side of a frame of the unmanned aerial vehicle.

9. The unmanned aerial vehicle of claim 1, wherein the passenger sized compartment is positioned on a bottom side of a frame of the unmanned aerial vehicle.

10. The unmanned aerial vehicle of claim 1, wherein the passenger sized compartment is sized to contain a single human passenger.

11. The unmanned aerial vehicle of claim 1, in which the rechargeable battery is sized to provide at least a minimum amount of electrical energy.

12. The unmanned aerial vehicle of claim 1, comprising a weather sensor configured to detect weather conditions.

13. The unmanned aerial vehicle of claim 12, comprising a control system configured to automatically modify a flight plan based on data detected by the weather sensor.

14. The unmanned aerial vehicle of claim 1, comprising a sensor configured to detect a condition of one or more components of the unmanned aerial vehicle.

15. The unmanned aerial vehicle of claim 14, comprising a control system configured to automatically modify a flight plan based on data detected by the sensor.

16. The unmanned aerial vehicle of claim 1, comprising an energy absorbing connector, in which the hybrid power generation system is coupled to a frame of the unmanned aerial vehicle through the energy absorbing connector.

17. The unmanned aerial vehicle of claim 1, wherein the hybrid energy generation system is configured to generate at least 150 kW of electrical power.

18. The unmanned aerial vehicle of claim 1, wherein the hybrid energy generation system is configured to generate up to 1 MW of electrical power.

19. The unmanned aerial vehicle of claim 1, wherein the generator motor is coupled to the engine by a metal plate.

20. The unmanned aerial vehicle of claim 1, wherein the engine comprises one or more of a two-stroke reciprocating piston engine, a four-stroke reciprocating piston engine, a gas turbine, and a rotary engine.

21. The unmanned aerial vehicle of claim 1, comprising a cooling system configured to cool the hybrid energy generation system.

22. The unmanned aerial vehicle of claim 1, wherein the generator motor comprises one or more of a permanent magnet synchronous generator, an induction generator, and a switched reluctance generator.

23. The unmanned aerial vehicle of claim 1, wherein the cooling device comprises a fan.

24. The unmanned aerial vehicle of claim 1, the hybrid generator system comprising a control unit configured to control a throttle of one or more of the engine and the generator motor based on a rotational speed of the rotor of the engine.

25. The unmanned aerial vehicle of claim 24, the hybrid generator system comprising a Hall effect sensor configured to detect a signal based on the rotational speed of the rotor of the engine, wherein the control unit is configured to control the throttle based on the detected signal.

26. The unmanned aerial vehicle of claim 25, wherein the control unit is configured to control the throttle based on a voltage generated by the Hall effect sensor responsive to detection of the signal.

27. The unmanned aerial vehicle of claim 26, wherein the control unit is configured to:
  compare the voltage generated by the Hall effect sensor to an output of the generator motor; and
  control the throttle of the one or more of the engine and the generator based on the comparison.

28. The unmanned aerial vehicle of claim 24, comprising a data center configured to communicate with another unmanned aerial vehicle, and
  wherein the control unit is configured to control the throttle based on an energy demand of the data center.

29. An unmanned aerial vehicle comprising:
  a passenger compartment sized to contain a human or animal passenger;
  at least one rotor motor configured to drive at least one propeller to rotate, the at least one propeller configured to generate lift sufficient to carry the human or animal passenger;
  a data center configured to communicate with another unmanned aerial vehicle; and
  a hybrid generator system configured to provide electrical energy to the at least one rotor motor and to the data center, the hybrid generator system comprising:
    a rechargeable battery configured to provide electrical energy to the at least one rotor motor;
    an engine configured to generate mechanical energy;
    a generator motor configured to generate electrical energy from the mechanical power generated by the engine;
    a coupling device directly coupling a rotor of the engine to the generator motor, the coupling device including a flexible coupling incorporating a fan;
    a Hall effect sensor configured to generate a voltage signal based on a rotational speed of the rotor of the engine; and
    a control unit configured to control a throttle of one or more of the engine and the generator motor based on (i) the voltage signal generated by the Hall effect sensor and (ii) an energy demand of the data center.

* * * * *